US011503232B2

(12) United States Patent
Guérin et al.

(10) Patent No.: US 11,503,232 B2
(45) Date of Patent: Nov. 15, 2022

(54) IMAGE SIGNAL PROCESSING FOR REDUCING LENS FLARE

(71) Applicant: GoPro, Inc., San Mateo, CA (US)

(72) Inventors: Guillaume Matthieu Guérin, Chatillon (FR); Karl Krissian, Fontenay-aux-Roses (FR); Bruno César Douady, Orsay (FR)

(73) Assignee: GoPro, Inc., San Mateo, CA (US)

( * ) Notice: Subject to any disclaimer, the term of this patent is extended or adjusted under 35 U.S.C. 154(b) by 53 days.

(21) Appl. No.: 16/992,679

(22) Filed: Aug. 13, 2020

(65) Prior Publication Data
US 2022/0053153 A1 Feb. 17, 2022

Related U.S. Application Data

(60) Provisional application No. 62/901,496, filed on Sep. 17, 2019.

(51) Int. Cl.
H04N 5/357 (2011.01)
H04N 9/67 (2006.01)
(Continued)

(52) U.S. Cl.
CPC ............ H04N 5/3572 (2013.01); G06T 5/50 (2013.01); H04N 9/67 (2013.01); H04N 9/77 (2013.01);
(Continued)

(58) Field of Classification Search
CPC .......... H04N 5/3572; H04N 9/67; H04N 9/77; G06T 5/50; G06T 2207/20212; G06T 2207/30168
See application file for complete search history.

(56) References Cited

U.S. PATENT DOCUMENTS 10,630,921 B2  4/2020 Douady-Pleven et al.
2009/0002529 A1  1/2009 Shurboff et al.
(Continued)

FOREIGN PATENT DOCUMENTS

WO    2014042104 A1    3/2014

OTHER PUBLICATIONS

International Search Report and Written Opinion for Application No. PCT/US2019/020241, dated Jun. 3, 2019, 12 pages.

Primary Examiner — Gevell V Selby
(74) Attorney, Agent, or Firm — Young Basile Hanlon & MacFarlane, P.C.

(57) ABSTRACT

Flare compensation includes receiving a first image and a second image; converting the first and the second images from an RGB domain to a YUV domain; obtaining an intensity differences profile along a stitch line between the first and the second images, where the intensity differences profile is obtained for the Y component; obtaining a dark corner intensity differences profile between the first and the second images based on a relative illumination of an area outside a first image circle of the first image and a second image circle of the second image, where the dark corner intensity differences profile is obtained for the Y component; obtaining a flare profile using the intensity differences profile and the dark corner intensity differences profile; converting the flare profile of the Y component to an RGB flare profile; and modifying one of the first or second images based on the RGB flare profile.

20 Claims, 25 Drawing Sheets

(51) Int. Cl.
*G06T 5/50* (2006.01)
*H04N 9/77* (2006.01)

(52) U.S. Cl.
CPC ............... *G06T 2207/20212* (2013.01); *G06T 2207/30168* (2013.01)

(56) References Cited

U.S. PATENT DOCUMENTS

| | | |
|---|---|---|
| 2009/0060369 A1 | 3/2009 | Agarwala et al. |
| 2011/0242352 A1 | 10/2011 | Hikosaka |
| 2012/0147213 A1 | 6/2012 | Dalton |
| 2013/0329132 A1 | 12/2013 | Tico et al. |
| 2014/0320715 A1 | 10/2014 | Haji-Khamneh et al. |
| 2015/0103181 A1 | 4/2015 | Mou |
| 2015/0146014 A1 | 5/2015 | Black et al. |
| 2015/0365576 A1 | 12/2015 | Wang et al. |
| 2017/0070689 A1* | 3/2017 | Silverstein ........... H04N 5/3651 |
| 2017/0094169 A1 | 3/2017 | Yoshikawa et al. |
| 2017/0243373 A1 | 8/2017 | Bevensee et al. |
| 2017/0359534 A1* | 12/2017 | Li ...................... H04N 5/23238 |
| 2019/0260978 A1* | 8/2019 | Guérin ............... H04N 5/23216 |

* cited by examiner

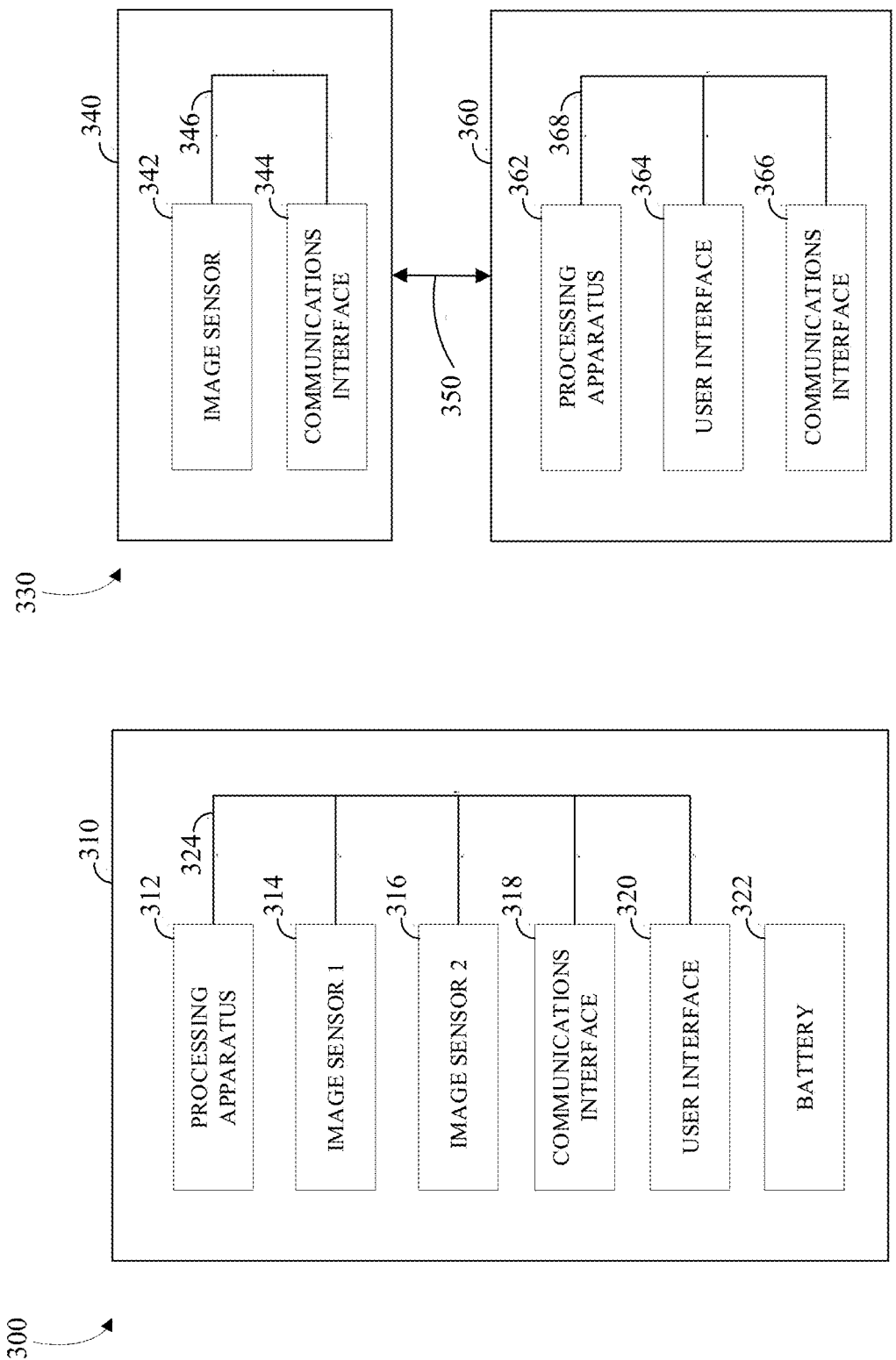

IMAGE SIGNAL PROCESSING FOR REDUCING LENS FLARE

CROSS REFERENCE TO RELATED APPLICATIONS

This application claims priority to and the benefit of U.S. Provisional Application No. 62/901,496, filed Sep. 17, 2019, the contents of which are incorporated by reference herein in its entirety.

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing for reducing lens flare. For simplicity, the descriptions disclosed herein refer to flare being generated by a primary light source. Implementations disclosed herein, however, may also compensate for flare discrepancies resulting from multiple light sources.

A first aspect of the disclosed implementations is a method for flare compensation in images, The method includes receiving a first image and a second image; converting the first image from an RGB domain to a YUV domain, where Y corresponds to a luminance (Y) component; converting the second image from the RGB domain to the YUV domain; obtaining an intensity differences profile along a stitch line between the first image and the second image, where the intensity differences profile is obtained for the Y component; obtaining a dark corner intensity differences profile between the first image and the second image based on a relative illumination of an area outside a first image circle of the first image and a second image circle of the second image, where the dark corner intensity differences profile is obtained for the Y component; obtaining a flare profile using the intensity differences profile and the dark corner intensity differences profile, where the flare profile is for the Y component; converting the flare profile of the Y component to an RGB flare profile; and modifying the first image based on the RGB flare profile to obtain a processed first image.

A second aspect of the disclosed implementations is a device for flare estimation. The device includes a processor that is configured to determine a stitch line between a first image and a second image; obtain a Y luminance flare estimate for points along the stitch line; obtain a chrominance flare estimate for the points along the stitch line from the Y luminance flare estimate using a function that, for a point of the stitch line, uses a respective ratio of a chrominance value related to the point of the stitch line and a luminance value related to the point of the stitch line; obtain an RGB flare estimate from the Y luminance flare estimate and the chrominance flare estimate; and correct at least one of the first image or the second image using the RGB flare estimate.

A third aspect of the disclosed implementations is a non-transitory computer-readable storage medium that includes executable instructions that, when executed by a processor, facilitate performance of operations including operations to obtain a luminance intensity difference profile along a stitch line between a first image and a second image, the first image can be obtained using a first camera sensor and the second image can be obtained using a second camera sensor; obtain a dark corner profile in a luminance component based on a relative illumination of an area outside a first image circle of the first image and a second image circle of the second image circle by operations including operations to compute a first YUV dark corner intensity alignment from the first image, compute a second YUV dark corner intensity alignment from the second image, and obtain the dark corner profile in the luminance component as a difference between respective Y components of the first YUV dark corner intensity alignment and the second YUV dark corner intensity alignment; obtain a flare in the luminance component using the luminance intensity difference profile and the dark corner profile in the luminance component; and modify at least one of the first image or the second image using the flare in the luminance component to obtain a reduced-flare first image or a reduced-flare second image.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

FIGS. 3A-B are block diagrams of examples of image capture systems.

DETAILED DESCRIPTION

Figure 1A:
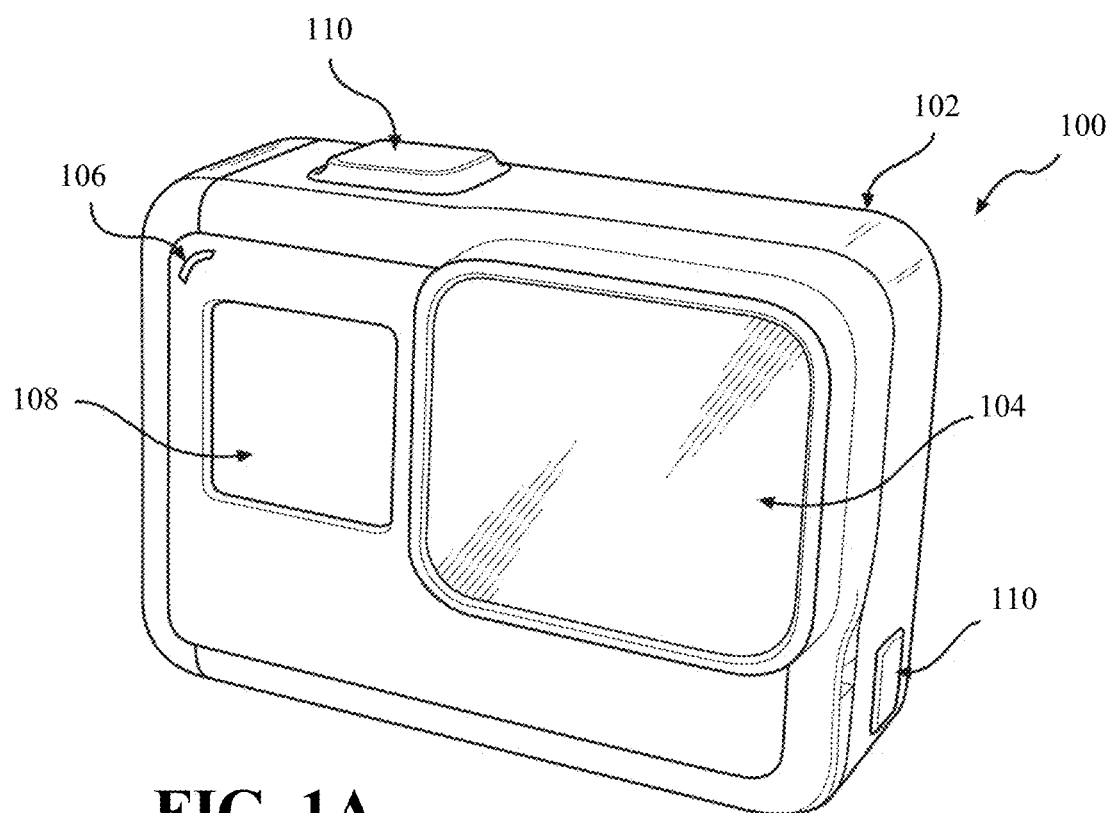
FIGS. 1A-D are isometric views of an example of an image capture device.

In the following, the term flare can refer to an optical phenomenon that is induced by parasite diffusion of the light inside a camera lens. As such, flare is an attribute that creates a difference between front and back lenses of a multi-lens camera. The differences can depend on the orientation and distance to a light source, which causes the flare. The flare can be visible on the stitch line and therefore needs to be blended or removed (see flare correction patent). The term dark corners can refer to areas of the camera sensor outside the fisheye projection disk. The term stitch line can refer to a set of positions following a curve and corresponding to correspondences between front and back camera content. The stitch line can be used to stitch front and back contents (e.g., an image or frame of a video captured using a front camera and an image or frame of the video captured using a back camera of an imaging device) into 360 degrees content. The term global flare can refer to global and constant additive and positive bias of RGB channel intensity induced by the flare phenomenon. The global flare can be different for each of the front and back lenses. The term local flare can refer to a mask of the additive flare subtracted by the global flare value, for each lens. The local flare can be either positive or negative. However, the total (e.g., combination) of local flare and the global flare is positive on each of RGB channels and for each lens.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors along a focused image path. An image sensor or sensors may sample the light and generate an electronic image signal. An image signal processor (ISP) may receive the image signal from one or more sensors and may process the image signal to generate an image, picture, or frame.

The image sensor may receive light along one or more paths other than the focused image path, such as light from a primary light source, such as the sun, reflected by an interior surface of the image capture device, and images captured by the image sensor may include lens flare corresponding to the light from the primary light source received along paths other than the focused image path. The lens flare may include lens flare artifacts, diffuse lens flare, or both in the respective image and may limit the accuracy, efficiency, or both of aligning an image that includes lens flare with a corresponding partially overlapping image that omits the lens flare to obtain a combined image.

Processing the image signal may include image signal processing for reducing lens flare. Image signal processing for reducing lens flare may include obtaining primary light source information, which may include information indicating an orientation of the image capture device relative to the primary light source, information indicating a brightness of the primary light source, or both. For example, the primary light source information may be obtained by projecting differences between overlapping portions of the image including the lens flare and the corresponding partially overlapping image that omits the lens flare onto a flare model. The primary light source information may be applied in conjunction with the flare model to the input image including the lens flare to obtain a flare reduced input image, which may reduce or eliminate the lens flare and improve the accuracy, efficiency, or both, of aligning the image that includes lens flare with the corresponding partially overlapping image that omits the lens flare to obtain the combined image.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
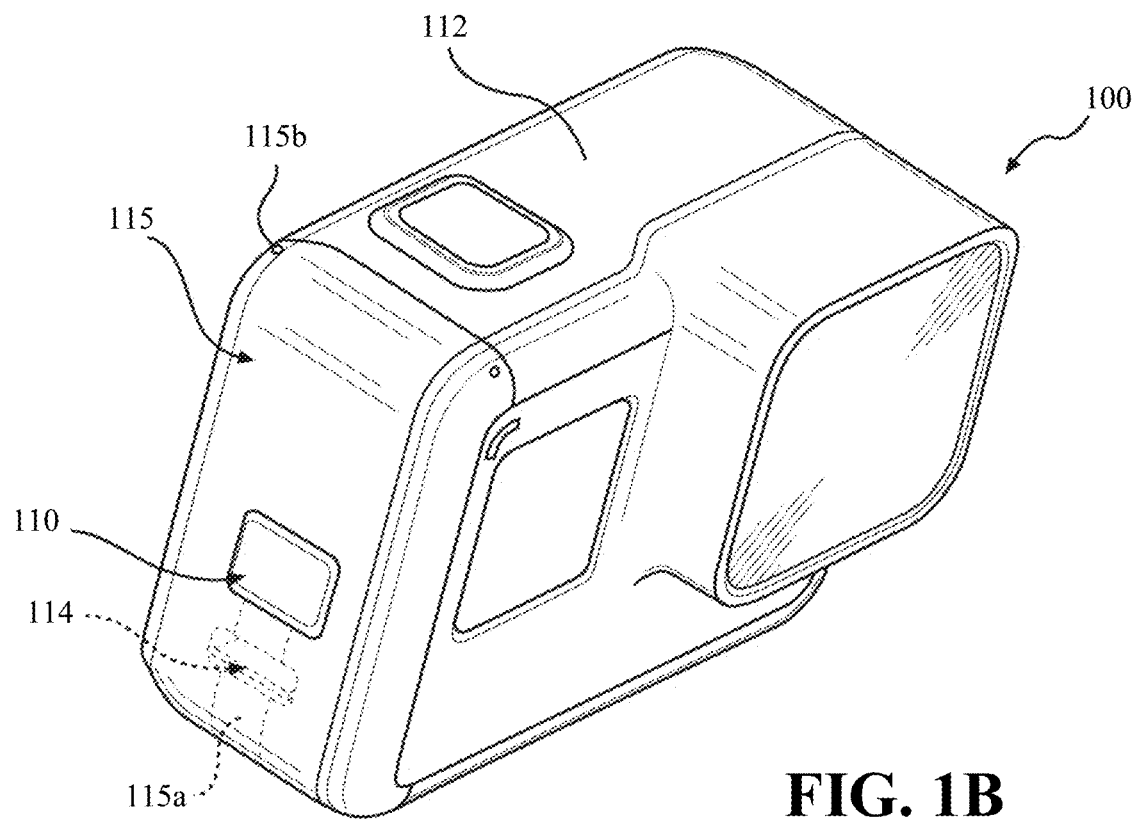
Figure 1C:
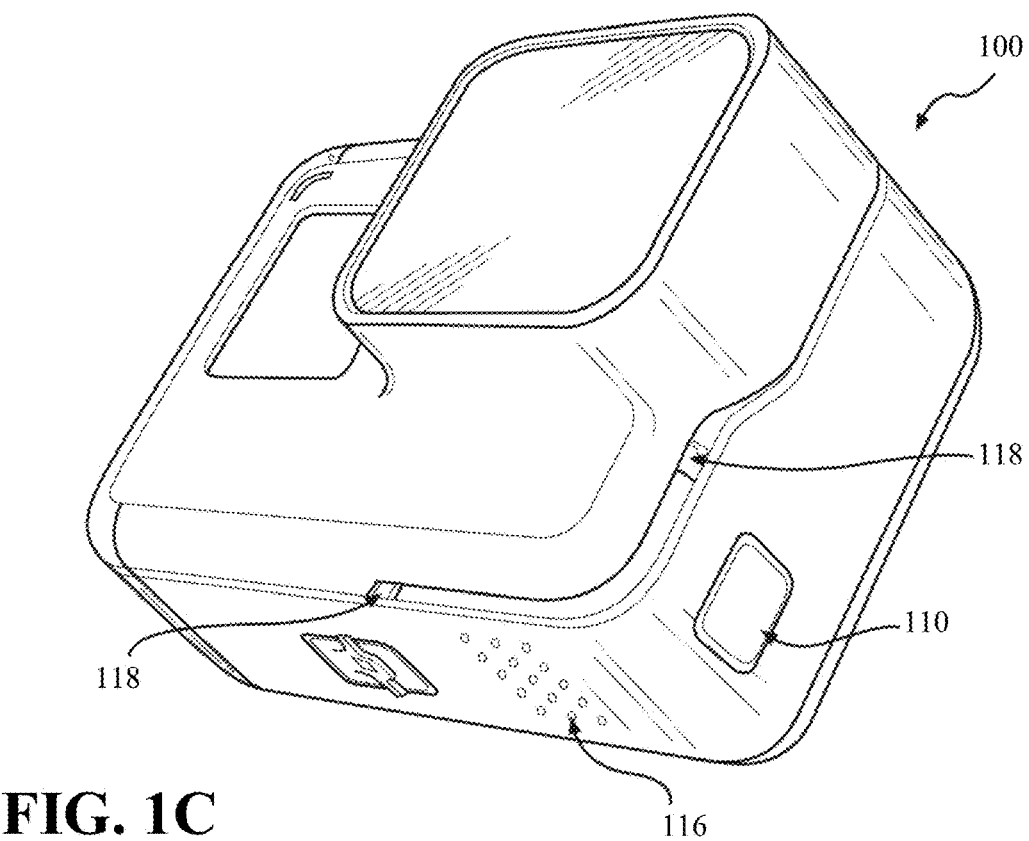
Figure 1D:
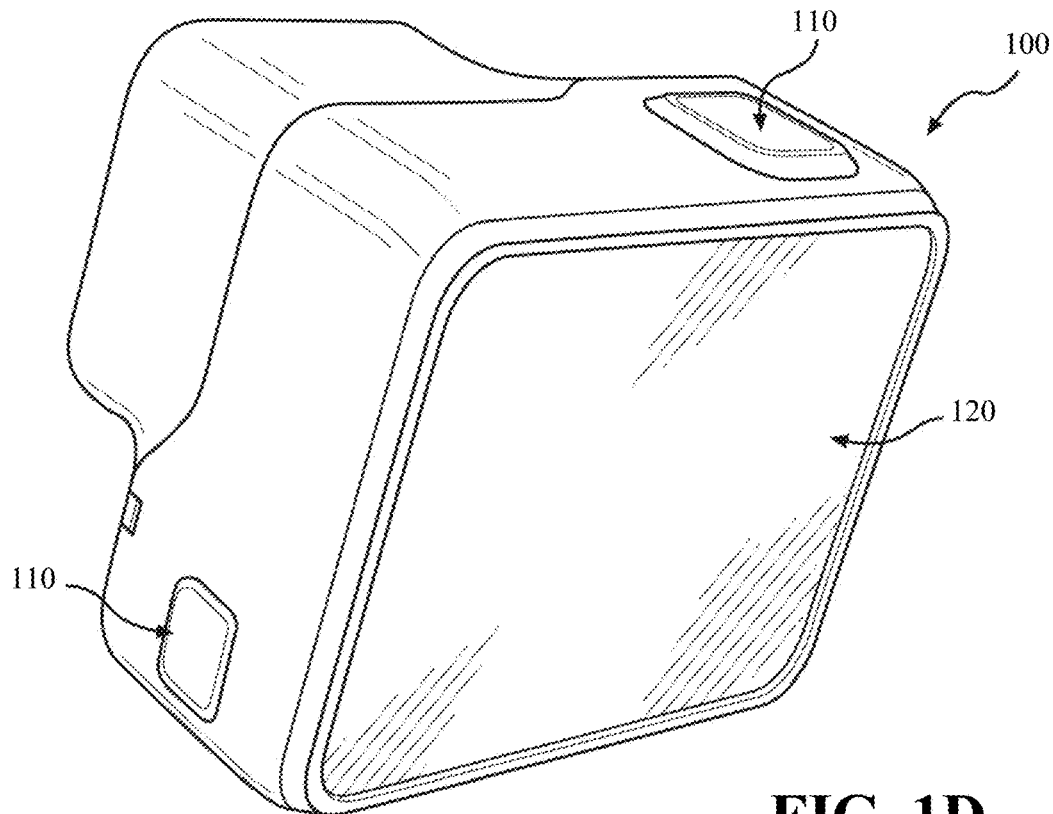

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
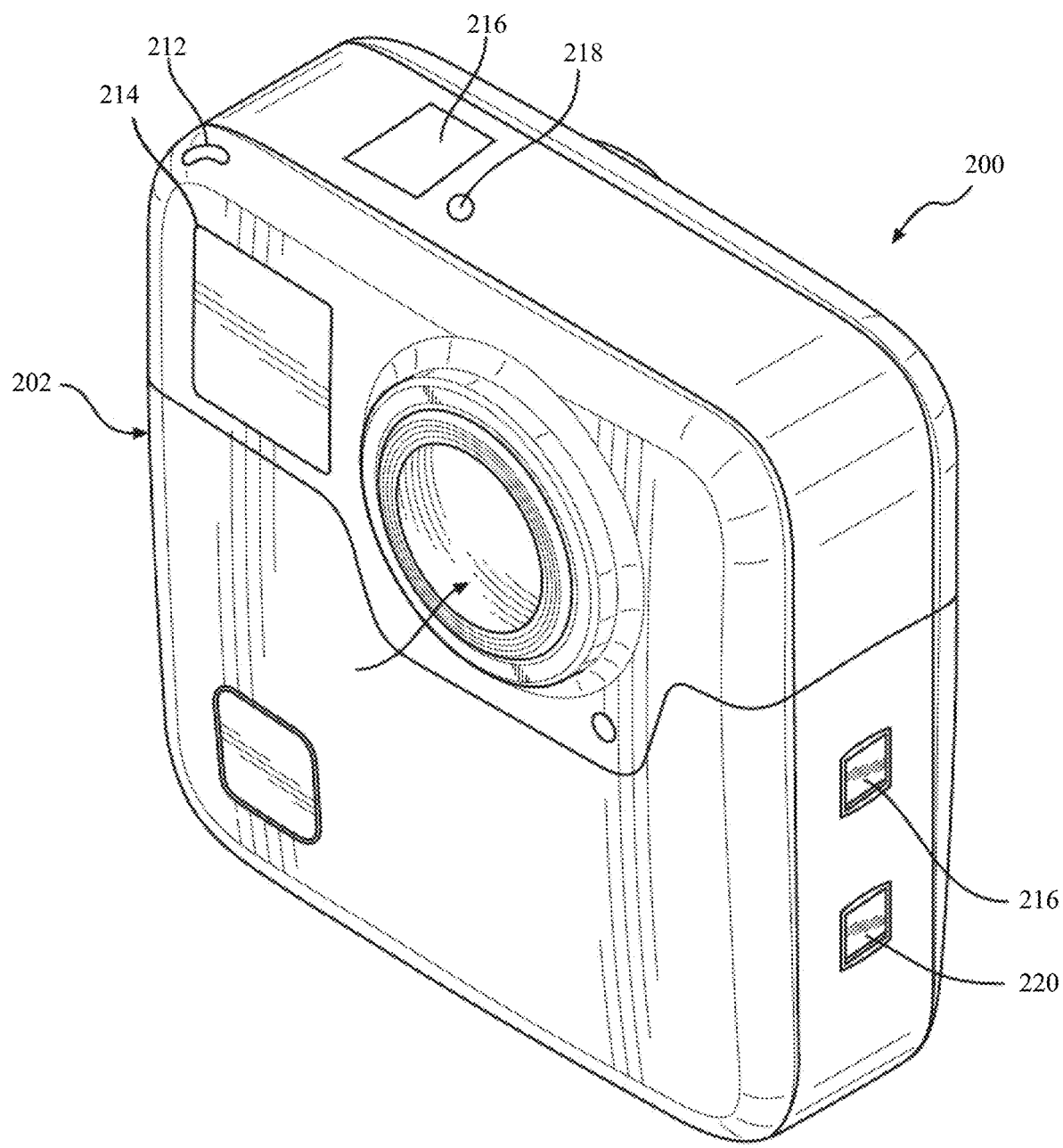
FIGS. 2A-B are isometric views of another example of an image capture device.
Figure 2B:
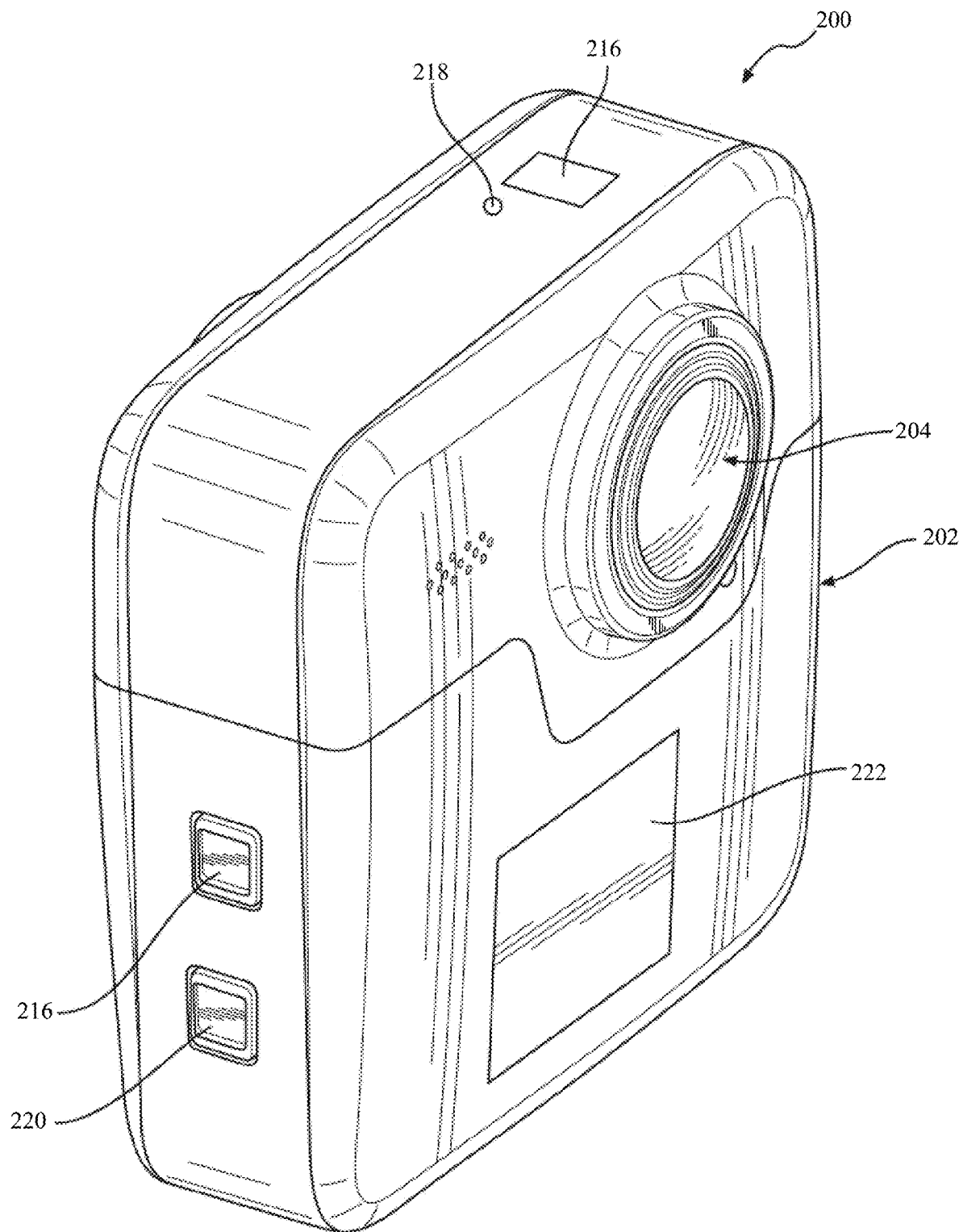

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
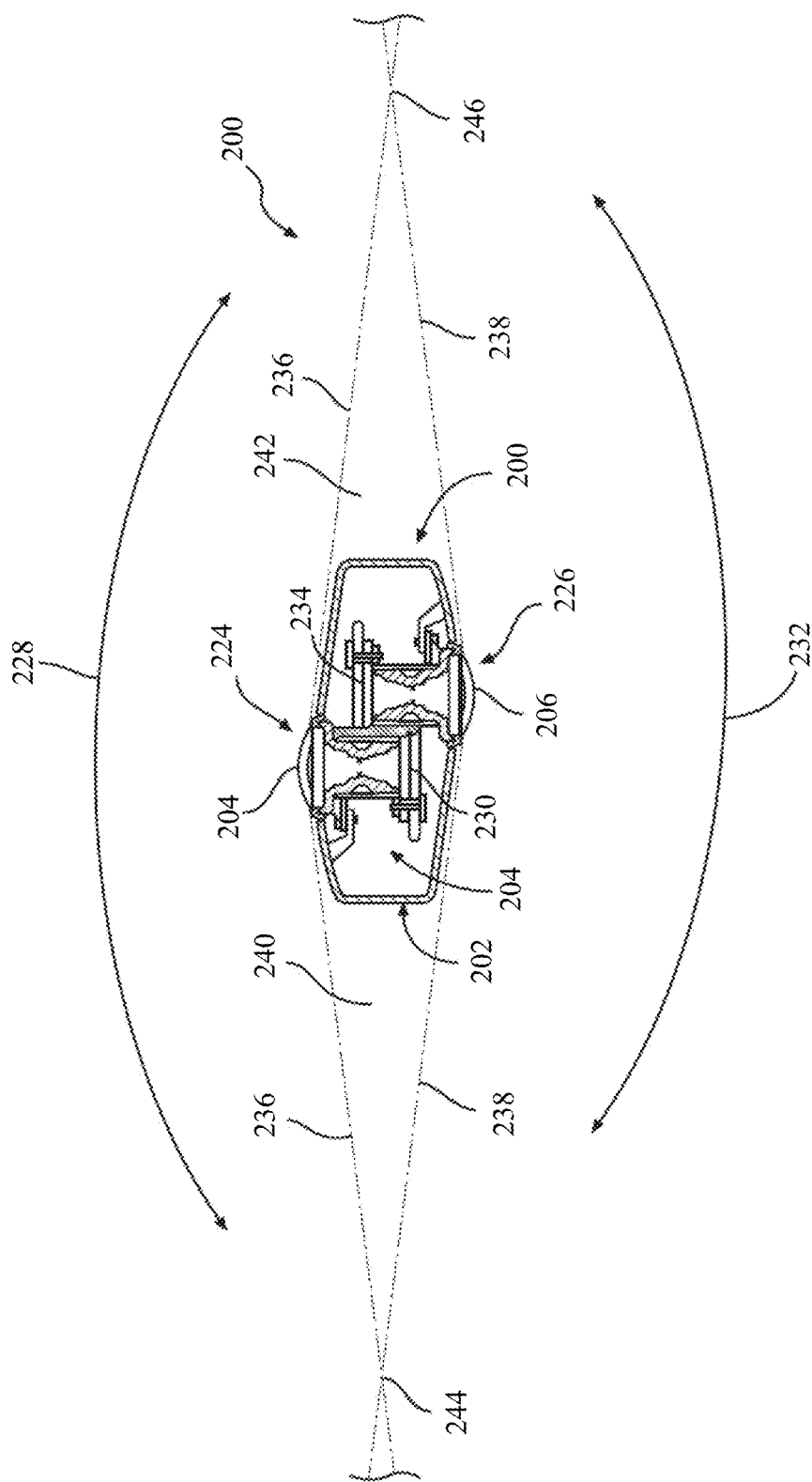
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

The image capture system 300 may be used to implement some or all of the techniques described in this disclosure, such as the techniques 900, 1000, 1500, 1600, 1800, 2100, 2200, 2300, and 2400 described in FIGS. 9, 10, 15, 16, 18, 21, 22, 23, and 24 respectively.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the techniques 900, 1000, 1500, 1600, 1800, and 2100 described in FIGS. 9, 10, 15, 16, 18, and 21, respectively.

Figure 4:
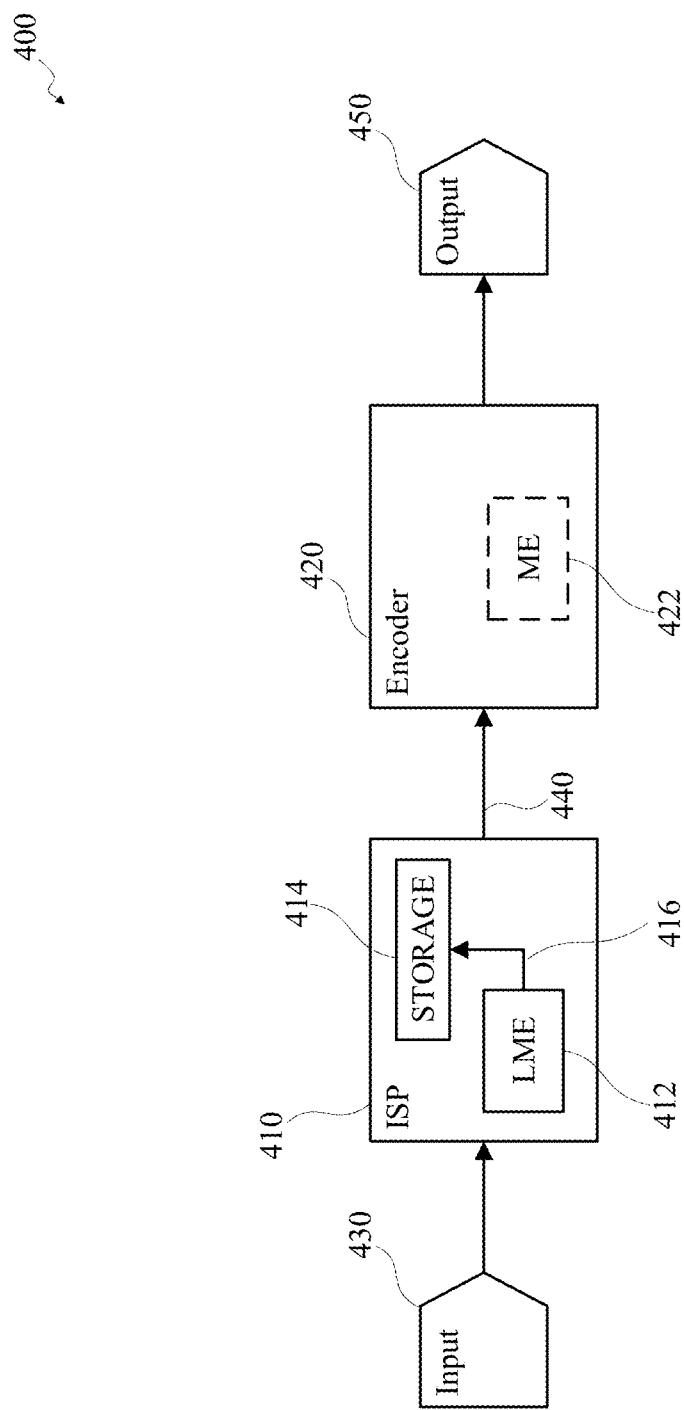
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 100 shown in FIGS. 1A-1D or the image capture device 200 shown in FIGS. 2A-2C, or an image capture system, such as one of the image capture systems 300 shown in FIG. 3A or the image capture system 330 shown in FIG. 3B. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as one of the image sensors 314 or 316 shown in FIG. 3A or the image sensor 342 shown in FIG. 3B, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence or series of frames captured at a rate, or frame rate, which may be a number or cardinality of frames captured per a defined temporal period, such as 24, 30, or 60 frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an x component and y component of motion, at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include electronic storage 414, such as memory, such as random-access memory (RAM), flash, or other types of memory. The electronic storage 414 may store local motion estimation information 416 determined by the local motion estimation unit 412 for one or more frames. The local motion estimation information 416 and associated image or images may be output 440 to the encoder 420. In some implementations, the electronic storage 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information, and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
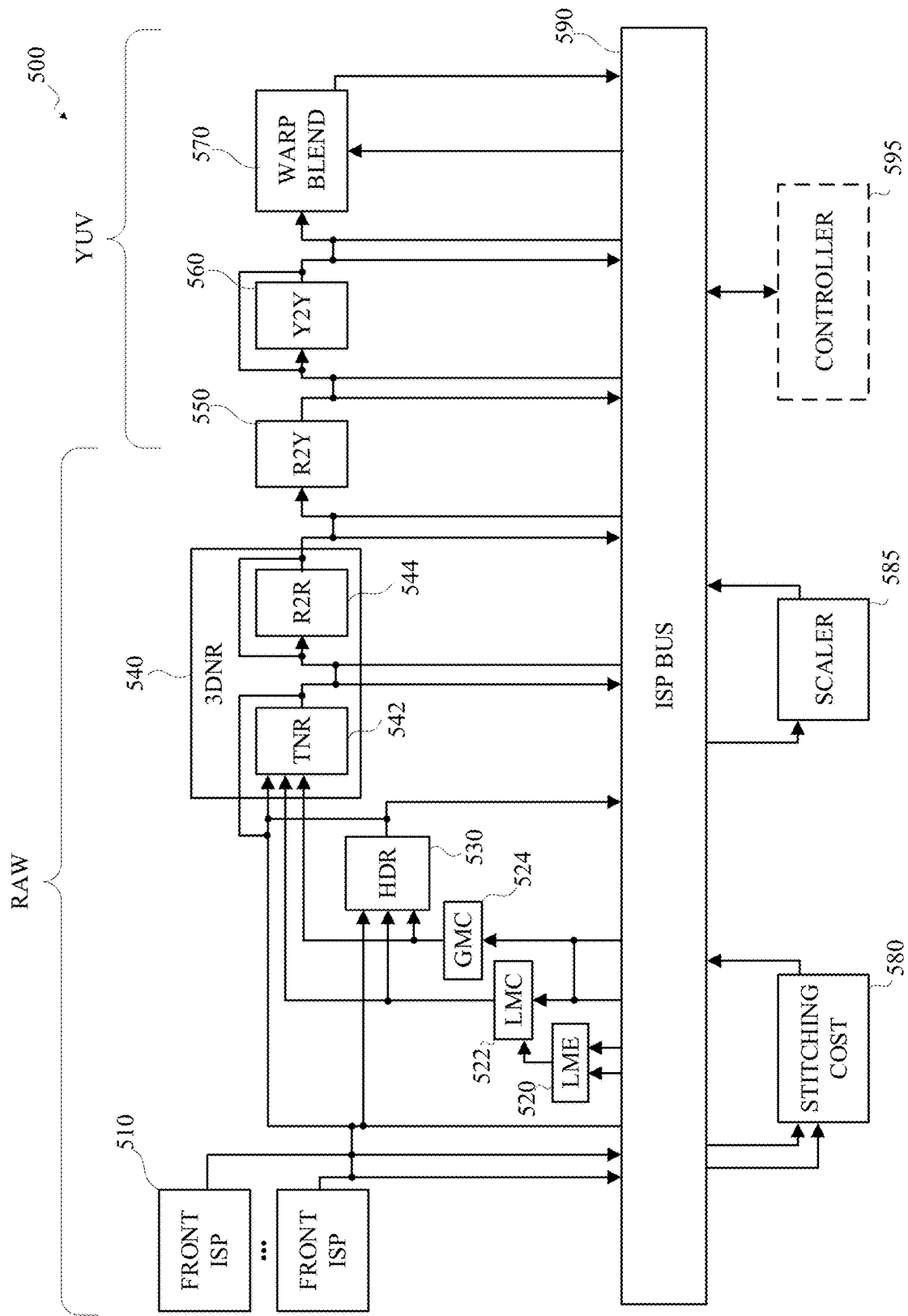
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 100 shown in FIGS. 1A-1D or the image capture device 200 shown in FIGS. 2A-2B, or an image capture system, such as one of the image capture systems 300 shown in FIG. 3A or the image capture system 330 shown in FIG. 3B. In some implementations, the image signal processor 500 may be similar to the image signal processor 410 shown in FIG. 4.

The image signal processor 500 may receive an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein each pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a ¹⁄₁₆×¹⁄₁₆ resolution frame, a ¹⁄₃₂×¹⁄₃₂ resolution frame, or any combination thereof.

In some implementations, a multiple-camera apparatus, such as the image capture device 200 shown in FIG. 2C, may include multiple image capture devices, and may include a respective front image signal processor 510 associated with each image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in a metadata unit (not shown), corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The high dynamic range (HDR) unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range (HDR) unit 530 may generate a high dynamic range image based on the current input image and the local motion compensated reference frame, the global motion compensated reference frame, or a combination thereof. For example, for each portion of the reference frame, such as each block, each pixel, or each Bayer, the temporal noise reduction unit 542 may identify a value for the portion based on the corresponding portion of the local motion compensated reference frame or the corresponding portion of the global motion compensated reference frame.

The high dynamic range (HDR) unit 530 may output the high dynamic range image. For example, the high dynamic range (HDR) unit 530 may output the high dynamic range image by storing the high dynamic range image in memory, such as shared memory, via the image signal processor bus 590, or the high dynamic range (HDR) unit 530 may output the high dynamic range image directly to another unit of the image signal processor 500, such as the temporal noise reduction unit 542.

In some implementations, the high dynamic range (HDR) unit 530 may be omitted, or high dynamic range processing by the high dynamic range (HDR) unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for each portion of the reference frame, such as each block, each pixel, or each Bayer, the temporal noise reduction unit 542 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing each pixel in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low-resolution frame generated by the front image signal processor 510.

The warp and blend unit 570 may apply one or more transformations to the frames. In some implementations, spherical images produced by a multi-face camera device, such as the image capture device 200 shown in FIG. 2C, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

The scaler 585 may scale images received from the output of the warp and blend unit 570, which may be in patches or blocks of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
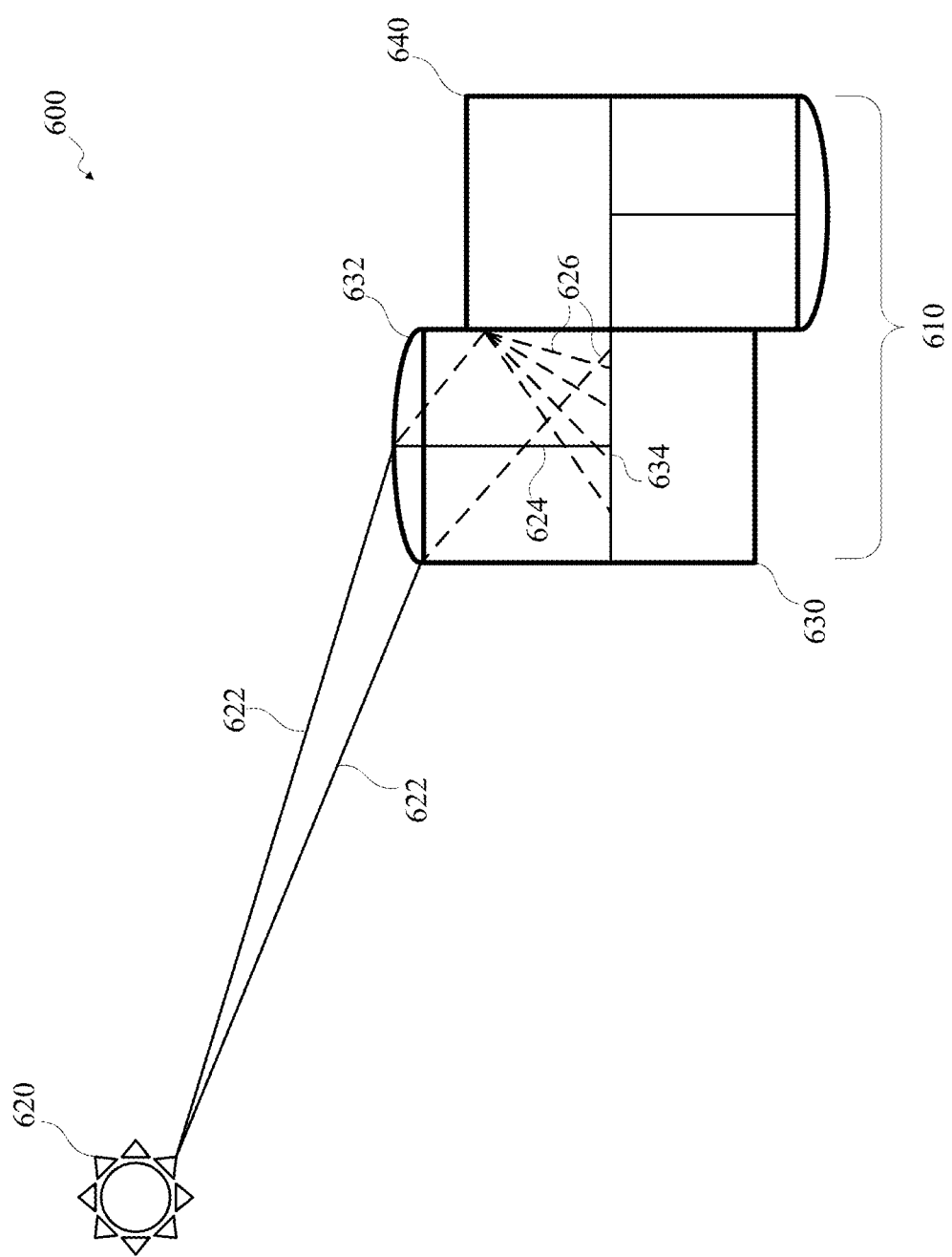
FIG. 6 is a diagram of an example of a lens flare scenario in accordance with implementations of this disclosure.

FIG. 6 is a diagram of an example of a lens flare scenario 600 in accordance with implementations of this disclosure.

The lens flare scenario 600 may include an image capture apparatus 610 for capturing one or more images of a scene, which may include a primary light source 620, such that one or more of the images captured includes lens flare.

The image capture apparatus 610 may be a multi-face image capture apparatus, such as the image capture device 200 shown in FIG. 2, and may include two or more image capture devices 630, 640, which may have overlapping fields-of-view, such as the overlapping fields-of-view 228 and 232 shown in FIG. 2C. For simplicity and clarity, the image capture apparatus 610 shown in FIG. 6 includes a first image capture device 630 and a second image capture device 640; however, the image capture apparatus 610 may include more image capture devices.

For example, the first image capture device 630 may include one or more optical elements 632, such as one or more of the lenses 204, 206 shown in FIG. 2C, and one or more image sensors 634, such as the first image sensor 314 or the second image sensor 316 shown in FIG. 3A, the image sensor 342 shown in FIG. 3B, or the image sensors 230, 234 of FIG. 2C.

The primary light source 620 may be the sun or another relatively bright light source, such as a high luminosity object in the scene, such as an object that is ten-thousand times brighter than other objects in the scene. The image capture apparatus 610 may be oriented with respect to, or relative to, the primary light source 620, such that the field-of-view of the first image capture device 630 includes the primary light source 620, and the field-of-view of the second image capture device 640 omits the primary light source 620.

The light 622 from the primary light source 620 may be directly received by the first image capture device 630. Other light, such as reflected light, light from a secondary light source, or a combination thereof, may be received by the first image capture device 630. The light 622 from the primary light source 620 may be prevented from being directly received by the second image capture device 640. Other light, such as reflected light, light from a secondary light source, or a combination thereof, may be received by the second image capture device 640.

In some embodiments, the primary light source 620 may be omitted from the respective fields-of-view of the image capture apparatus 610, the primary light source 620 may be relatively near the field-of-view of the first image capture device 630, some of the light 622 from the primary light source 620 may be directly received by the first image capture device 630, and the image captured by the first image capture device 630 may include lens flare. Although the lens flare is shown to result from primary light source 620, it is understood that lens flare may result from multiple light sources. The multiple light sources may be distributed on both sides of the device such that each image capture device receives a subset of light sources. In some examples, one or more light sources may be in the overlapping area.

A significant portion, such as 99.9, or 99.99, percent, of the light received, captured, measured, sampled, or otherwise used by the image sensor 634 to obtain the image may be light received via a primary image capture path 624. For example, the light received via the primary image capture path 624 may be light received by the optical elements 632 of the first image capture device 630 and focused by the optical elements 632 along the primary image capture path 624 to the image sensor 634 of the first image capture device 630.

A small portion, such as one-tenth, or one-hundredth, of one percent, of the light received, captured, measured, sampled, or otherwise used by the image sensor 634 to obtain the image may be light received via one or more secondary image capture paths 626, as indicated by the broken lines in FIG. 6. For example, the light received via the secondary image capture paths 626 may be light, which may include a portion of the light 622 directly from the primary light source 620, reflected, refracted, or otherwise propagated along the secondary image capture paths 626 to the image sensor 634, such as light reflected off of an inner surface of the image capture device 630.

Light received by the image sensor 634 along one or more of the secondary image capture paths 626 may be captured, or otherwise included in a captured image, as a lens flare artifact. As used herein, the term "lens flare artifact" may refer to one or more distinct portions of a captured image corresponding to light received along one or more of the secondary image capture paths 626. For example, the distinct portions of the captured images corresponding to a lens flare artifact may be one or more geometric shapes, such as circles, which may correspond with the shape of an iris of the lens, and which may be distributed along a line in the captured image. Lens flare artifacts may be visually distinguishable from other visible elements captured in an image. An example of an image including lens flare artifacts is shown in FIG. 7.

Figure 8:
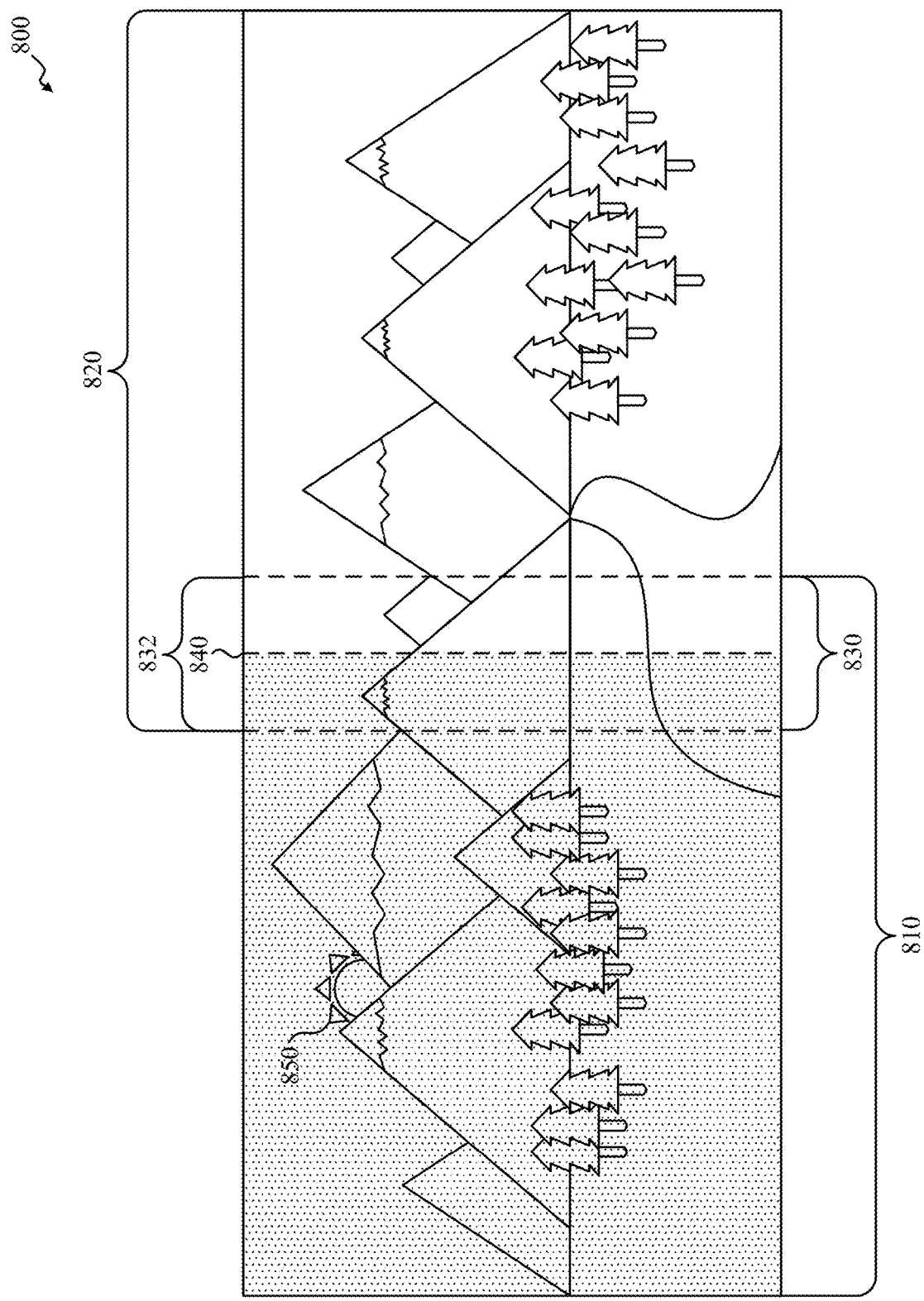
FIG. 8 is a diagram of an example of a combined image including diffuse lens flare in accordance with implementations of this disclosure.

Light received by the image sensor 634 along one or more of the secondary image capture paths 626 may be captured, or otherwise included in a captured image, as diffuse lens flare. As used herein, the term "diffuse lens flare" may refer to a spatially indistinct color, or luminance, distortion, such as distortion in contrast or color saturation, which may be distributed throughout the captured image, or a significant portion, such as greater than half, thereof. Diffuse lens flare may be visually indistinguishable from other visible elements captured in an image. The intensity, brightness, or amount of distortion associated with diffuse lens flare may vary within an image, such as based on the relative orientation of the image capture apparatus 610 to the primary light source 620. An example of an image including diffuse lens flare is shown in FIG. 8.

The second image capture device 640 may concurrently, or substantially concurrently, capture an image, or frame, temporally corresponding to, and spatially partially overlapping, the image captured by the first image capture device 630. The image captured by the second image capture device 640 may omit the lens flare.

Figure 7:
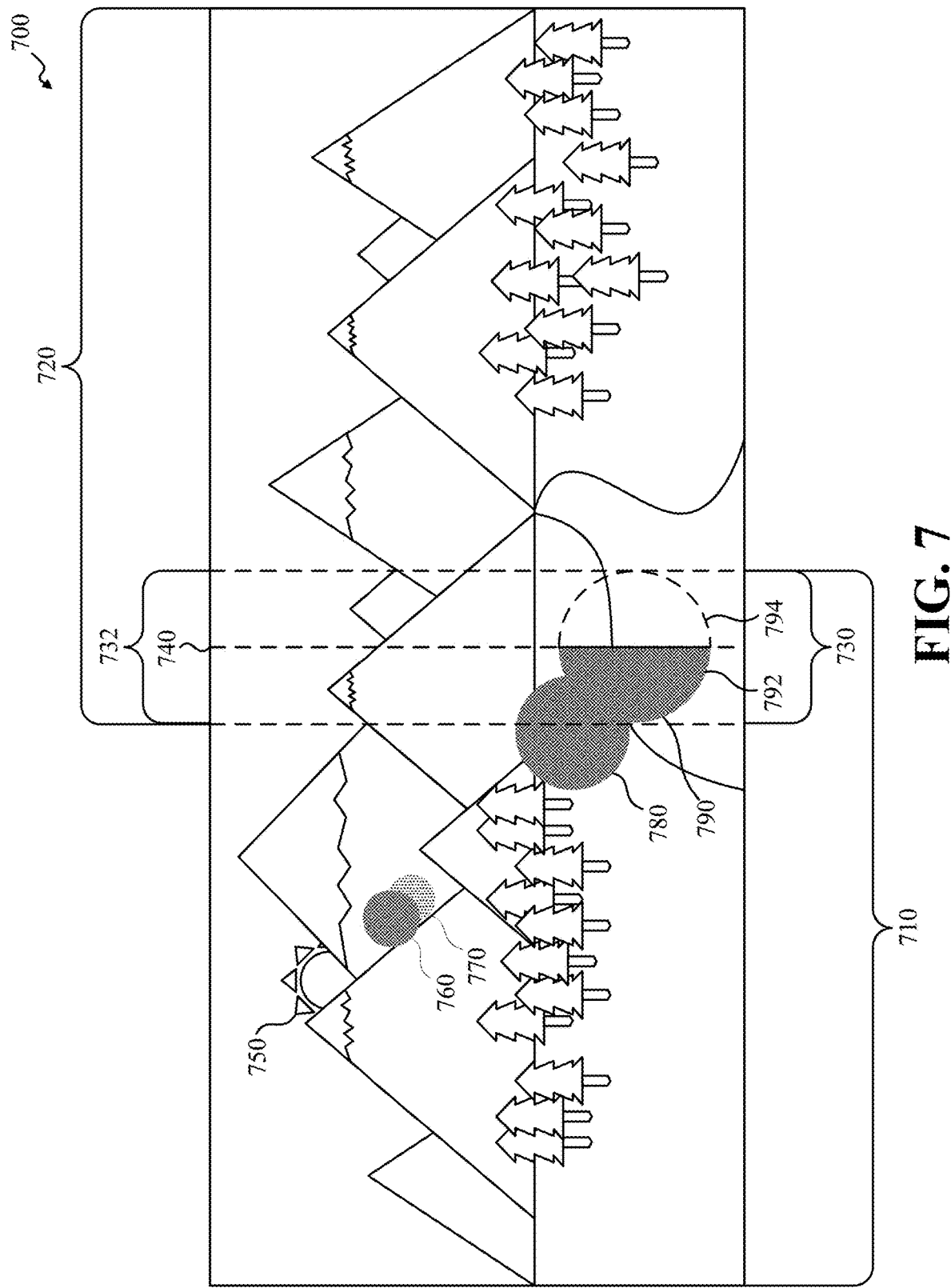
FIG. 7 is a diagram of an example of a combined image including lens flare artifacts in accordance with implementations of this disclosure.

FIG. 7 is a diagram of an example of a combined image 700 including lens flare artifacts in accordance with implementations of this disclosure. The combined image 700 may be an image obtained by combining, merging, or stitching together temporally concurrent, or substantially temporally concurrent, spatially overlapping images captured by respective image capture devices of an image capture apparatus, such as two or more of the image capture devices 100, 200 of shown in FIGS. 1 and 2, the image capture devices 310, 340 of the image capture apparatus 300 and 330 shown in FIG. 3, or the image capture devices 630, 640 of the image capture apparatus 610 shown in FIG. 6.

For example, a first image capture device may capture the left image 710, and a second image capture device may capture the right image 720. The first image capture device and the second image capture device may have overlapping fields-of-view; the first image 710 may include an overlapping portion 730; and the second image 720 may include a spatially corresponding overlapping portion 732. A combined image 700 may be obtained by combining, merging, or stitching the first image 710 together with the second image 720 along a stitching boundary 740.

The first image 710 may include a primary light source 750, such as the sun, and may include lens flare artifacts 760, 770, 780, 790 corresponding to the primary light source 750. The second image 720 may omit the primary light source 750 and may omit the lens flare artifacts 760, 770, 780, 790. The lens flare artifact 790 may intersect with the stitching boundary 740; a portion 792 of the lens flare artifact 790 along the stitching boundary 740 may be included in the combined image 700, as indicated by the stippled background at 792; and a portion 794 of the lens flare artifact 790 along the stitching boundary 740 may be omitted from the combined image 700, as indicated by the broken line border at 794.

For simplicity and clarity, the input images 710, 720 shown in FIG. 7 are referred to as the left image 710 and the right image 720, respectively, and the combined image is shown as being combined along a vertical stitching boundary 740; however, the relative orientation of the respective images and the path of the stitching boundary may differ. For example, the stitching boundary may have a sinusoidal path.

FIG. 8 is a diagram of an example of a combined image 800 including diffuse lens flare in accordance with implementations of this disclosure. The combined image 800 may be an image obtained by combining, merging, or stitching together, temporally concurrent, or substantially concurrent, spatially overlapping images captured by respective image capture devices of an image capture apparatus, such as two or more of the image capture device 100 of FIG. 1, the image capture device 200 of FIG. 2, or the image capture devices 630, 640 of the image capture apparatus 610 shown in FIG. 6.

For example, a first image capture device may capture the left image 810, and a second image capture device may capture the right image 820. The first image capture device and the second image capture device may have overlapping fields-of-view; the first image 810 may include an overlapping portion 830; and the second image 820 may include a spatially corresponding overlapping portion 832. A combined image 800 may be obtained by combining, merging, or stitching the first image 810 together with the second image 820 along a stitching boundary 840.

The first image 810 may include a primary light source 850, such as the sun, and may include diffuse lens flare corresponding to the primary light source 850, as indicated by the stippled background. The stippled background is shown for clarity in FIG. 8. The diffuse lens flare may distort the color of the first image 810 and the corresponding portion of the combined image 800, such as by decreasing contrast or color saturation, which may cause the first image 810 and the corresponding portion of the combined image 800 to appear lighter, brighter, pale, hazy, foggy, less detailed, or a combination thereof.

The second image 820 may omit the primary light source 850 and may omit the diffuse lens flare, as indicated by the white background. For example, the second image 820, and the portion of the combined image 800 corresponding to the second image 820, may be darker than the first image 810 and the portion of the combined image 800 corresponding to the first image 810.

In some embodiments, an image may include lens flare artifacts, such as the lens flare artifacts 760, 770, 780, 790 shown in FIG. 7, and diffuse lens flare, such as the diffuse lens flare shown in FIG. 8.

For simplicity and clarity, the input images 810, 820 shown in FIG. 8 are referred to as the left image 810 and the right image 820, respectively, and the combined image is shown as being combined along a vertical stitching boundary 840; however, the relative orientation of the respective images and the path of the stitching boundary may differ. For example, the stitching boundary may have a sinusoidal path. In another example, the input images may be spherical images, and the overlapping portions may be a respective ring along the outer edge of each of the spherical images.

Figure 9:
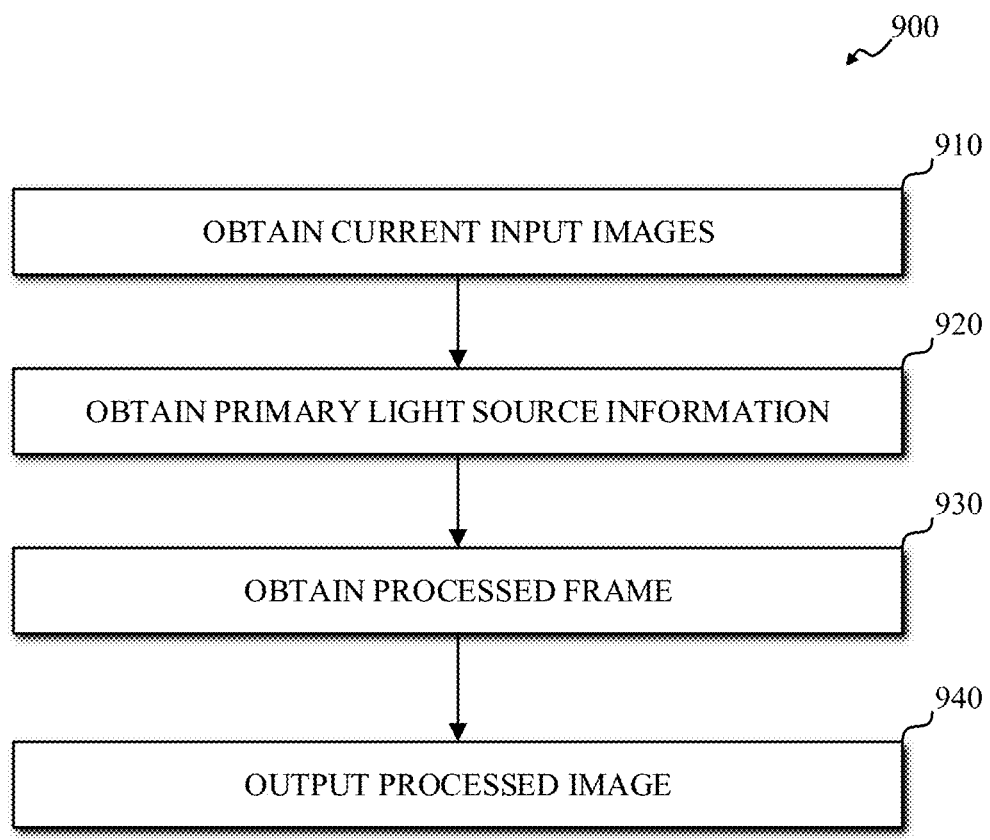
FIG. 9 is a diagram of an example of a technique for image signal processing for reducing lens flare in accordance with implementations of this disclosure.

FIG. 9 is a diagram of an example of a technique 900 for image signal processing for reducing lens flare in accordance with implementations of this disclosure. The technique 900 may be implemented in an image capture apparatus, such as the image capture apparatus 200 shown in FIG. 2. For example, the image signal processor 500 shown in FIG. 5 may implement the technique 900.

In some implementations, the technique 900 may include obtaining input images or input image data at 910; obtaining primary light source information at 920; obtaining a processed image, or frame, at 930; outputting the processed image, or frame, at 940; or a combination thereof.

Input image data may be obtained at 910. An image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the first image sensor 230 or the second image sensor 234 shown in FIG. 2C or the image sensors 314, 316, 342 shown in FIGS. 3A-3B, or from one or more front image signal processors, such as the front image signal processors 510 shown in FIG. 5, which may include the input image data for an input image.

For example, an image capture apparatus, such as the image capture apparatus 610 shown in FIG. 6, may include two or more image capture devices, such as the image capture devices 630, 640 shown in FIG. 6, which may have overlapping fields-of-view, and the image capture apparatus may obtain a first image signal from the first image capture device and a second image signal from the second image capture device. The first image signal may correspond to a first input image representing a first field-of-view, which may include a primary light source, such as the sun. The second image signal may correspond to a second input image representing a second field-of-view, which may overlap with the first field-of-view, and which may omit the primary light source. The first input image may be temporally concurrent with the second input image. The first input image may include lens flare, and the second input image may omit the lens flare.

Primary light source information corresponding to the primary light source may be obtained at 920. The primary light source information may be obtained based on the first input image, the second input image, or a combination thereof.

Obtaining the primary light source orientation information at 920 may include obtaining the primary light source orientation information based on image data, non-image data, or both. Image data may include color or pixel values, or data derived therefrom, from the input images. Non-image data may include data captured, recorded, or generated in association with the input images, such as temporal data, geospatial data, accelerometer data, magnetometer data, or any other data, or combination of data, distinct from image data that may be used for identifying or determining the primary light source orientation information.

The primary light source brightness information may indicate a brightness, or luminance, of the primary light source. For example, the primary light source may be brighter, such as ten-thousand times brighter, than other content captured in the respective images. The primary light source brightness information may be expressed in a color format, such as a color format including a red component (R), a green component (G), and a blue component (B). Other formats may be used.

Obtaining the primary light source information at 920 based on image data may include obtaining one or more differences between the overlapping portion of the first input image and the second input image. For example, obtaining the primary light source information at 920 may include obtaining an expected, or predicted, alignment of the overlapping portion of the first input image with the spatially corresponding portion of the overlapping portion of the second input image, and obtaining differences between the aligned overlapping portion of the first input image and the aligned overlapping portion of the second input image. The expected, or predicted, alignment may be obtained based on a defined alignment, such as an alignment obtained for a previously generated combined image, and the expected, or predicted, alignment may be obtained independently of, such as prior to, obtaining an alignment for generating a current combined image.

In some embodiments, the difference between the overlapping portion of the first input image and the overlapping portion of the second input image may be obtained based on a subset of the pixels from the respective overlapping portions, such as half of the pixels from the overlapping portion of the first input image and half of the pixels from the overlapping portion of the second input image. Other amounts of pixel data, such as a defined cardinality of pixels, such as 1000 pixels, or a comparison of pixel level information such as luminance, may be used. Intensity differences may be measured along the stitch line, border of the images, or both, and diffused towards the center without a priori knowledge about the one or more sources that may be generating the flare difference.

In some embodiments, obtaining the primary light source orientation information at 920 may omit obtaining the primary light source orientation information based on image data, and may include obtaining the primary light source orientation information based on non-image data. Obtaining the primary light source orientation information at 920 based on non-image data may include obtaining non-image data, such as gyroscopic data, accelerometer data, magnetometer data, global positioning system data, temporal data, any other non-image data, or a combination thereof. For example, the non-image data may include geospatial information, which may indicate a geospatial orientation, or geospatial location, of the primary light source relative to the image capture apparatus or one or more of the image capture devices, and obtaining the primary light source orientation information based on non-image data may include correlating the geospatial orientation information to spatial orientation information within one or more of the input images. Obtaining the primary light source orientation information at 920 based on non-image data may be independent of evaluating or otherwise processing the image data.

In some embodiments, such as embodiments including obtaining the primary light source orientation information at 920 based on non-image data, the accuracy of obtaining the primary light source brightness information based on image data may exceed the accuracy of obtaining both the primary light source orientation information and the primary light source brightness information based on image data.

A processed image, or frame, may be obtained at 930. Obtaining the processed image, or frame, may include obtaining a flare reduced input image having minimized, reduced, or eliminated lens flare. For example, a flare model, such as the flare model used for obtaining the primary light source information obtained at 920, may be projected or applied to the input image that includes the lens flare based on the primary light source information obtained at 920 to minimize, reduce, or eliminate the lens flare. Applying the flare model to minimize, reduce, or eliminate the lens flare at 930 based on the primary light source information obtained at 920 may be the reverse of projecting the differences between the overlapping portions onto the flare model to obtain the primary light source information at 920.

In some embodiments, obtaining the processed image at 930 may include eliminating, or reducing, diffuse lens flare, such as the diffuse lens flare shown in FIG. 8. In some embodiments, obtaining the processed image at 930 may include eliminating, or reducing, lens flare artifacts, such as the lens flare artifacts 760, 770, 780, 790 shown in FIG. 7. In some embodiments, obtaining the processed image at 930 may include eliminating, or reducing, both diffuse lens flare, such as the diffuse lens flare shown in FIG. 8, and lens flare artifacts, such as the lens flare artifacts 760, 770, 780, 790 shown in FIG. 7.

Obtaining the processed image at 930 may include further processing, such as combining the flare reduced input image with one or more corresponding input images to obtain a combined image, or frame, which may be output, such as stored or transmitted, at 940. In some embodiments, the flare reduced input image may be output at 940.

Obtaining a combined image based on the flare reduced input image may improve the accuracy, the efficiency, or both, of obtaining the combined image relative to obtaining the combined image based on the input image including lens flare.

For example, obtaining the combined image may include aligning the input images. The color values of portions, such as pixels, from the input image including lens flare may differ from the color values of spatially corresponding portions, such as spatially corresponding pixels, from the partially overlapping input image. The differences in pixel values may prevent, or significantly reduce the accuracy of, image alignment. Image alignment may be performed based on color gradients, rather than pixel values; however, image alignment based on color gradients may be less efficient, less accurate, or both, relative to image alignment based on pixel values.

The differences between the color values of portions, such as pixels, from the flare reduced input image and the color values of spatially corresponding portions, such as spatially corresponding pixels, from the partially overlapping input image may be minimized, reduced, or eliminated relative to the differences between the color values of portions, such as pixels, from the input image including lens flare and the color values of spatially corresponding portions, such as spatially corresponding pixels, from the partially overlapping input image. Image alignment may be performed based on pixel values, or other discrete image portion color values, from the flare reduced input image and the partially overlapping input image, which may be more efficient, more accurate, or both, relative to image alignment based on color gradients.

A flare compensation algorithm may be implemented in a dual-lens configuration, such as the image capture device 200 of FIG. 2. In this example, the algorithm may obtain three inputs. For example, a first input may include an image pair (front and back) that supports still frames extracted from a video stream. For example, the still frames may include JPG and DXR raw image format frames. A second input may include a geometrical calibration for each image capture device and the lever arm between the image capture devices. The geometrical calibration information may be stored as metadata, for example, as general purpose metadata framework (GPMF) tags in the image. A third input may include the shooting parameters of each image. For example, the shooting parameters may include the gain, the integration time, or both, for each image.

Figure 10:
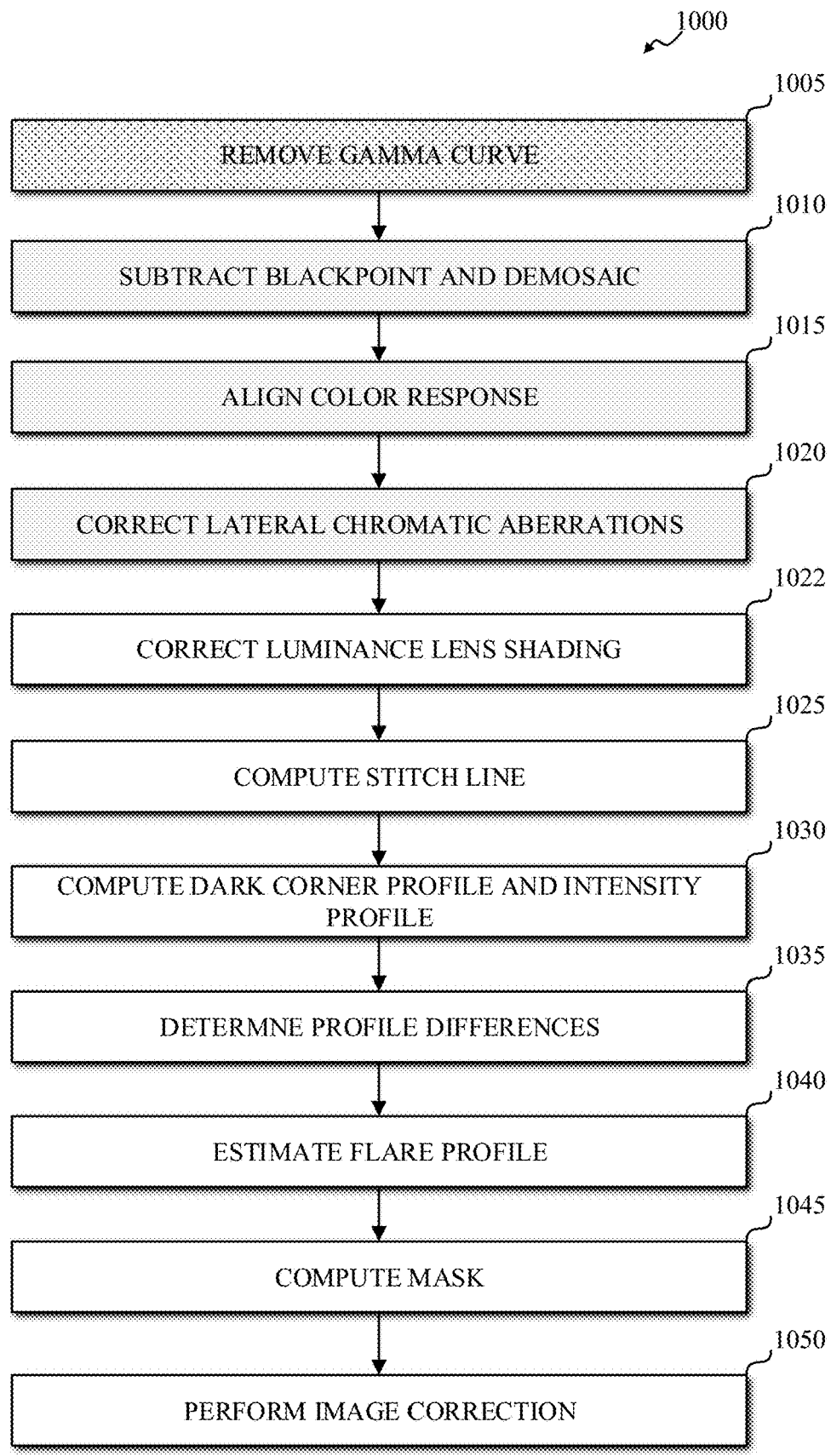
FIG. 10 is a diagram of an example of a technique for image signal processing for reducing lens flare in accordance with implementations of this disclosure.

FIG. 10 is a diagram of an example of a technique 1000 for image signal processing for reducing lens flare in accordance with implementations of this disclosure. The technique 1000 may be implemented in an image capture apparatus, such as the image capture apparatus 200 shown in FIG. 2, the image capture system 300 shown in FIG. 3A, or the image capture system 330 shown in FIG. 3B. For example, the image signal processor 500 shown in FIG. 5 may implement the technique 1000.

Referring to FIG. 10, in order to be able to quantify flare, the images are transformed into the linear domain to remove the gamma curve 1005 for images in a JPG format. Block 1005 is shown in stippling to indicate that this step may only be performed for images in JPG format. Accordingly, block 1005 may not be performed for images in a RAW format. The images may be transformed using Equation (1) below.

$$I_{linear} = TC_{sRGB}^{-1}(TC_{flat}^{-1}(I_{in})) \quad \text{Equation (1)}$$

At block 1010, the black point may be subtracted from the input raw data prior to demosaicing. In this example, the color filter array may be of a type Bayer 3. At block 1015, the color response from each image capture device is aligned onto the D50 illuminant. The calibration process measures the D50 scales for the red and blue channels relative to the average green channel. Both image capture devices are then aligned on the same D50 reference using Equation (2) below.

$$\begin{bmatrix} I_r^* \\ I_g^* \\ I_b^* \end{bmatrix} = \begin{bmatrix} k_r & 0 & 0 \\ 0 & 1.0 & 0 \\ 0 & 0 & k_b \end{bmatrix} \begin{bmatrix} I_r \\ I_g \\ I_b \end{bmatrix} \quad \text{Equation (2)}$$

where $$\begin{cases} k_r = \dfrac{Green_{d50}}{Red_{d50}} \\ k_b = \dfrac{Green_{d50}}{Blue_{d50}} \end{cases}$$

At block 1020, the lateral chromatic aberrations are corrected. At block 1022, the luminance lens shading is corrected. A stitch line is then computed at block 1025. At block 1030, the image capture device computes a dark corner profile and an intensity profile. The differences in the profiles are then determined at block 1035. At block 1040, a flare profile is estimated, and a mask is computed at block 1045. At block 1050, image correction is performed. Blocks 1010, 1015, and 1020 are shaded to indicate that these steps may only be performed on RAW images. Accordingly, blocks 1010, 1015, and 1020 may not be performed on JPG images.

Figure 11:
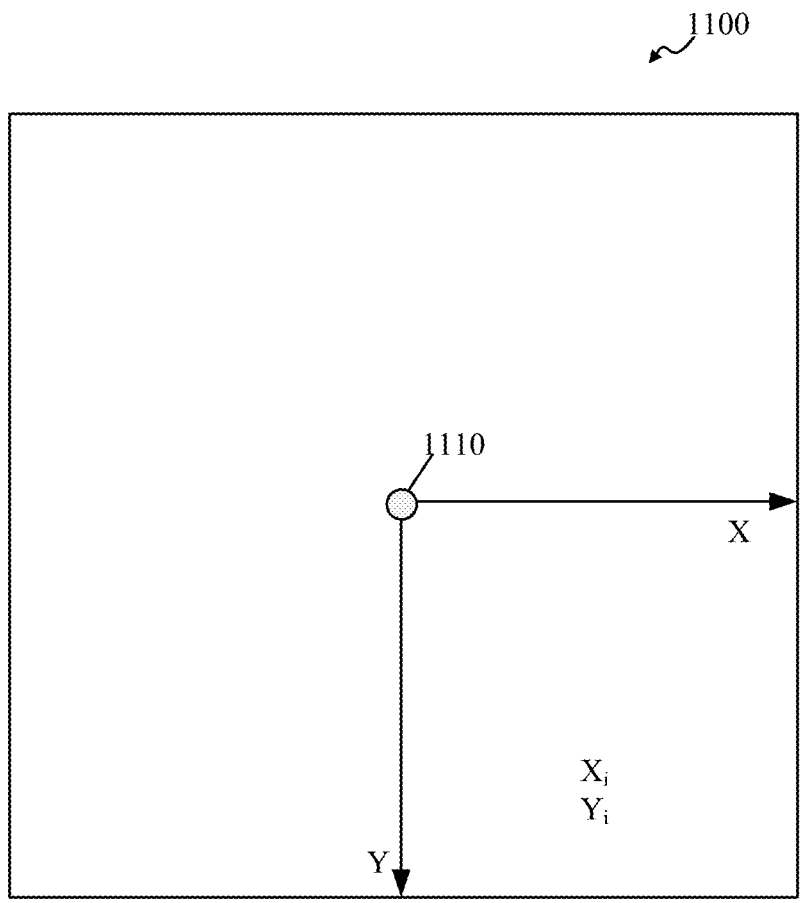
FIG. 11 is a diagram of an example of a square photo centered frame.

FIG. 11 is a diagram of an example of a square photo centered frame 1100. Referring to FIG. 11, the center of the square photo includes a principal point 1110 shown as a vertex of an X and Y axis.

Referring to block 1020 of FIG. 10, a square photo centered frame such as the example shown in FIG. 11 may be used for lateral chromatic aberration correction. The lateral chromatic aberrations may be corrected using the theoretical model created by numerical simulation on a Z600 lens design. In this example, for each pixel, the algorithm computes the relative displacement to the green channel per Equation (3) below.

$$x_{corrected} = k_{channel} * f(x_{raw}, channel) \quad \text{Equation (3)}$$

where $$x_i = \begin{bmatrix} x_i \\ y_i \end{bmatrix}$$

The luminance lens shading correction may apply a gain depending on the distance to the principal point. The gain may compensate for the lens falloff per Equation (4) below.

$$I_{corrected} = k_x * I_{in} \quad \text{Equation (4)}$$

where $$x = \begin{bmatrix} x \\ y \end{bmatrix}$$

Similar to the lateral chromatic aberration correction, a square photo centered frame may be used for luminance lens shading correction. In this example, the gain may be computed using a polynomial of degree 6.

Referring again to FIG. 10, a stitch line is computed at block 1025. In this example, intensities are measured on the same object in order to compare intensities. The stitch line computation uses a disparity estimation algorithm to ensure alignment of imagery onto the same scene content. Original images are passed to the stitcher and will return the stitch line position in the square format image. The stitching algorithm may deliver a vector corresponding to a 1 disparity shift. The latter may be used when computing the profiles. The stitch line ($S_{back}$ and $S_{front}$) and epipolar line ($E_{back}$ and $E_{front}$) may be computed according to Equation (5) and Equation (6) below.

$$S_{back} = \begin{bmatrix} x_0 & y_0 \\ x_1 & y_1 \\ \ldots & \ldots \\ x_n & y_n \end{bmatrix} S_{front} = \begin{bmatrix} x_0 & y_0 \\ x_1 & y_1 \\ \ldots & \ldots \\ x_n & y_n \end{bmatrix} \quad \text{Equation (5)}$$

$$E_{back} = \begin{bmatrix} dx_0 & dy_0 \\ dx_1 & dy_1 \\ \ldots & \ldots \\ dx_n & dy_n \end{bmatrix} E_{front} = \begin{bmatrix} dx_0 & dy_0 \\ dx_1 & dy_1 \\ \ldots & \ldots \\ dx_n & dy_n \end{bmatrix} \quad \text{Equation (6)}$$

Figure 12:
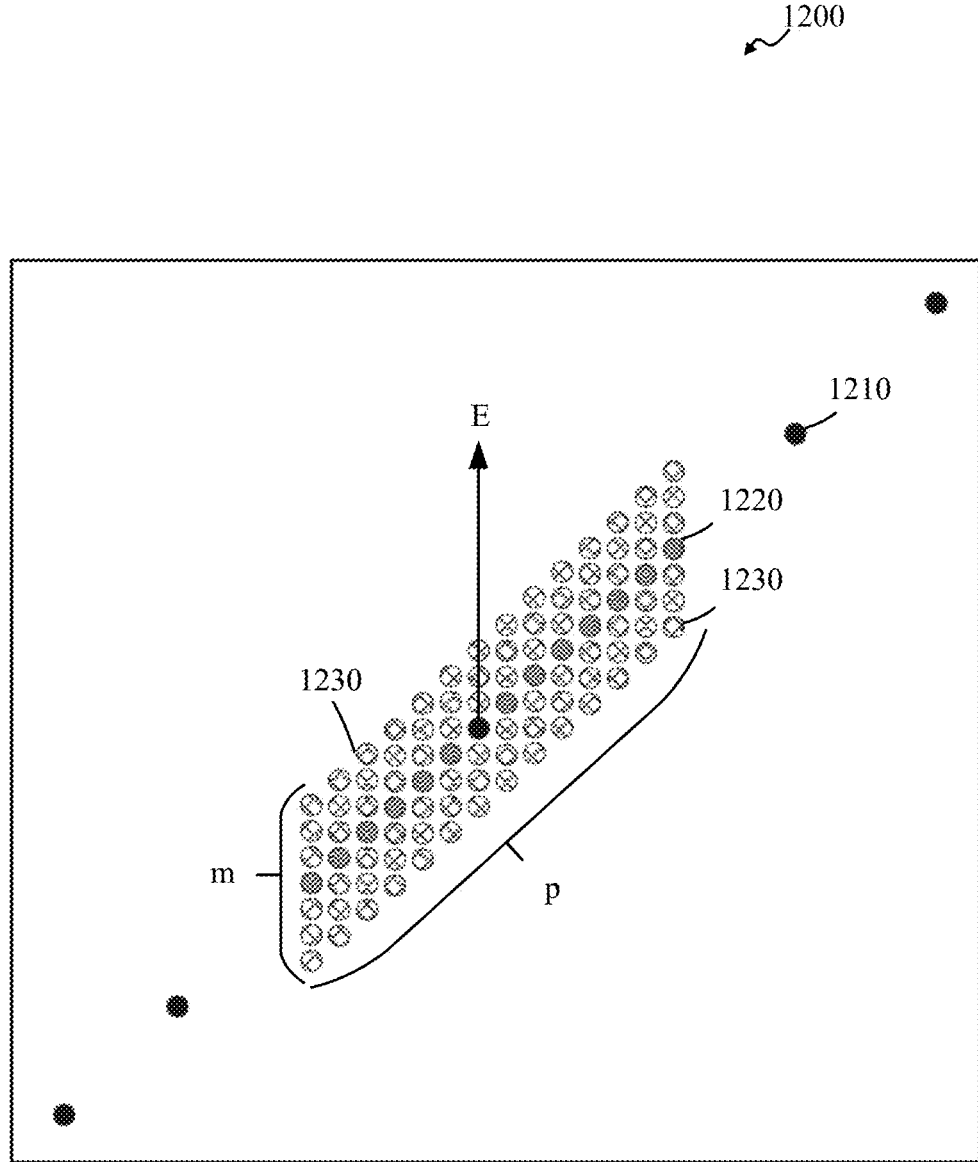
FIG. 12 is a diagram of an example of a sampling pattern used around a vertex of the stitch line.

FIG. 12 is a diagram of an example of a sampling pattern 1200 used around a vertex of the stitch line. In this example, sample points of a stitch line vertex are represented by solid circles 1210. The sample points along a stitch line subsample are represented by stippled circles 1220. The sample points along an epipolar direction (E) subsample are represented by cross-hatched circles 1230. In this example, the maximum distance along the epipolar direction may be tuned and is shown as m in FIG. 12. In this example, p describes the amount of samples used along the stitch line to compute the statistical value.

Referring again to FIG. 10, at block 1030, the image capture device computes a dark corner profile and an intensity profile. In some instances, intensity differences may exist when comparing profiles along the stitch line. Some reasons for these intensity differences may include an object that is outside of a disparity range (i.e., the object is too close to the sensor), the presence of occlusions, or inaccuracies of the stitcher due to inaccurate calibration or drifts in content with poor textures. A dark corner profile may be derived by considering portions of the sensor that are visible in the image but outside the image circle. The relative illumination in the dark corner areas outside the image circle may include information about the source intensity and the quantity of flare. Considering the relative illumination in the dark corner areas outside the image circle may aid in rejecting false positives.

From the pair of square images, an average intensity profile along a circle outside of the image circle may be extracted. The average intensity profile along the circle outside of the image circle may be referred to as a dark profile. The dark profile may be an average of intensities measured along circles with increasing radius. The dark profile may be derived using Equation (7) and Equation (8) below.

$$\theta \in [0, 2\pi] \begin{cases} x_i = \frac{\text{width}}{2} - \text{radius} * \sin(\theta) - \frac{u_0}{2} \\ y_i = \frac{\text{height}}{2} - \text{radius} * \cos(\theta) - \frac{v_0}{2} \end{cases} \quad \text{Equation (7)}$$

$$C(\text{channel}, \theta_j) = \frac{1}{n-s} \sum_{i=s}^{n} C_i(\text{channel}, \theta_j) \quad \text{Equation (8)}$$

For each vertex of the stitch line, a local average of the intensity may be measured. For example, the sampling pattern used may ensure that measurements are performed on the same scene elements in the front and in the back image. When building an intensity profile for each image, the maximum distance along the epipolar direction may be tuned, as shown in FIG. 12. The maximum distance, m, along the epipolar direction may be a value that includes one or more compromises. One compromise may include reducing sensitivity to pixel level discrepancies, such as noise, remaining color aberrations, calibration accuracy, or a combination thereof. Another compromise may include the risk of measuring on different objects. For example, the risk may increase with the distance from the stitch line. Yet another compromise may include the risk of having a saturated sample in one of the images. In this example, to ensure an aggregation of statistics performed on a same region in both images, the statistic is rejected when it is determined that one of the samples is saturated. An intensity profile on each image may be determined using Equation (9), Equation (10), and Equation (11) below.

$$x_{i,d\theta} = f\left(\text{channel}, S_{side}(\theta_j + d\theta) + i * \frac{E_{side}(\theta_j)}{\|E_{side}(\theta_j)\|}\right) \quad \text{Equation (9)}$$

$$I_{side}(\text{channel}, \theta_j) = \frac{a}{pm} \sum_{d\theta=-p}^{\frac{p}{2}} \sum_{2i=-\frac{m}{2}}^{\frac{m}{2}} x_{i,d\theta} \quad \text{Equation (10)}$$

$$a = \prod_{d\theta=-p}^{\frac{p}{2}} \prod_{2i=-\frac{m}{2}}^{\frac{m}{2}} \text{issat}(x_{i,d\theta}) \quad \text{Equation (11)}$$

An entire statistic may be rejected (i.e., zeroed out) based on a determination that one sample is saturated per Equation (12) below.

$$\text{issat}(x) = \begin{cases} 0 \text{ if } x > \text{saturation} \\ 1 \text{ otherwise} \end{cases} \quad \text{Equation (12)}$$

Referring again to FIG. 10, at block 1035 the profile differences are determined. Profile subtraction between the front image and the back image may occur in multiple operations. For example, a first operation may include aligning intensity by compensating exposures between the front image and the back image. A second operation may include setting the saturated values to "no information" (nan) and then computing the difference between the profiles. The difference between the profiles may be determined according to Equation (13) below.

$$\Delta I(\text{channel}, \theta) = \quad \text{Equation (13)}$$
$$\text{sat2nan}\left(I_{back}(\text{channel}, \theta) * \frac{EV_{target}}{EV_{back}}, I_{back}(\text{channel}, \theta)\right) -$$
$$\text{sat2nan}\left(I_{front}(\text{channel}, \theta) * \frac{EV_{target}}{EV_{front}}, I_{front}(\text{channel}, \theta)\right)$$

Similarly, the differences in corner estimates may be determined according to Equation (14) below.

$$\text{Equation (14)}$$
$$\Delta C(\text{channel}, \theta) = \text{sat2nan}\left(C_{back}(\text{channel}, \theta) * \frac{EV_{target}}{EV_{back}}, C_{back}(\text{channel}, \theta)\right) -$$
$$\text{sat2nan}\left(C_{front}(\text{channel}, \theta) * \frac{EV_{target}}{EV_{front}}, C_{front}(\text{channel}, \theta)\right)$$

where $$EV_{target} = \max(EV_{back}, EV_{front})$$

and $$\text{sat2nan(value)} = \begin{cases} \text{nan if value} \geq \text{saturation limit} \\ \text{value} \end{cases}$$

Referring to block 1040 of FIG. 10, the flare profile may be estimated along the border of the image circle. In order to determine the flare profile along the border of the image circle, two sources of information may be combined. A first source of information may include the difference of intensities along the stitch line between the front image capture device and the back image capture device. The stitch line may pass on the same objects in the two images, and the intensity differences may be explained by the flare. A second source of information may include the difference along concentric circles measured outside of the image circle. This area may be referred to as a dark corner area. The assumption is that the difference from pure black is due to parasite reflections in the barrel and at each interface in the optical system. The observations may be performed on each channel independently.

Figure 13:
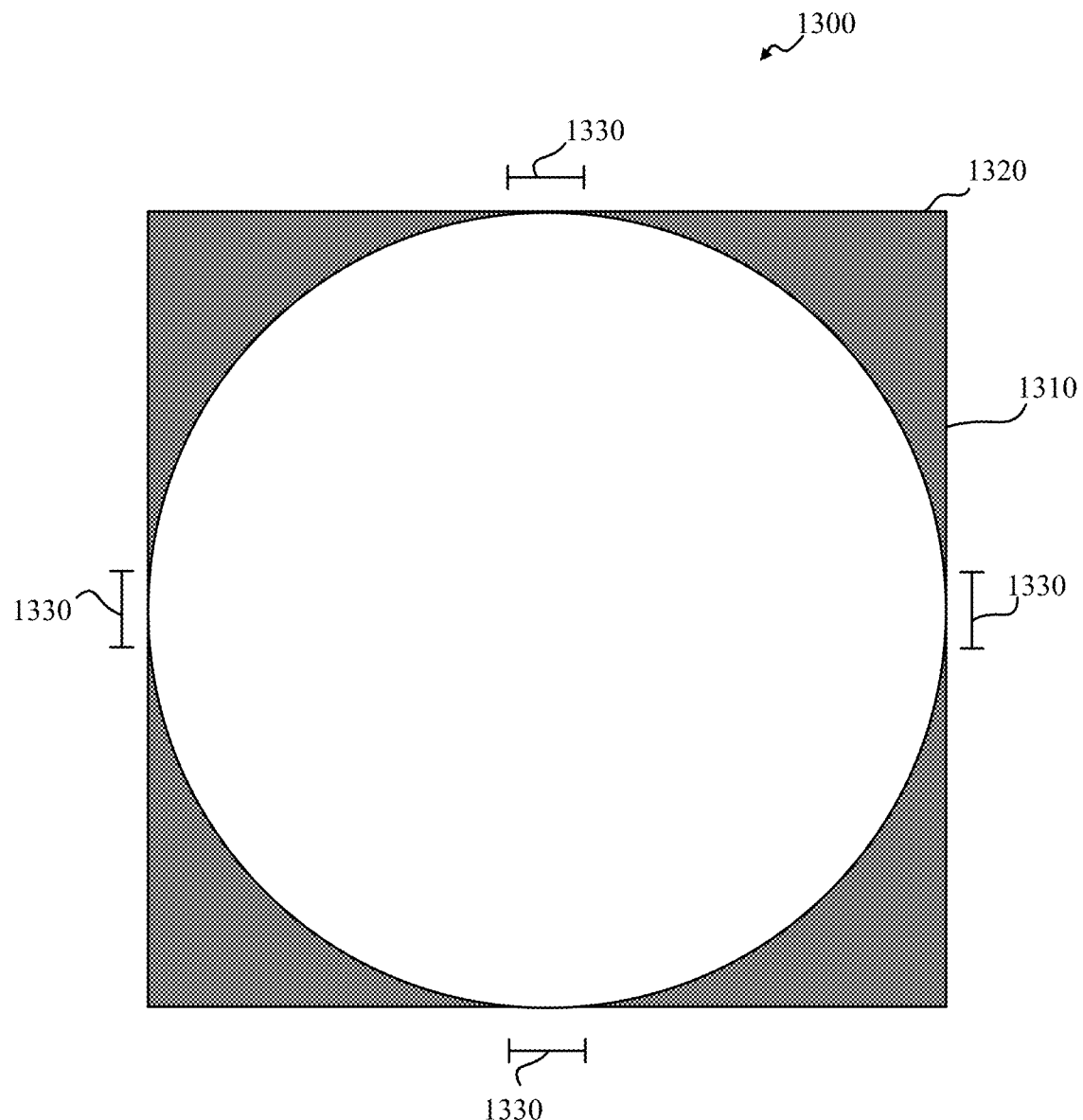
FIG. 13 is a diagram of an example of an image that includes an image circle portion and dark corner areas.

FIG. 13 is a diagram of an example of an image 1300 captured by an image capture apparatus, such as the image capture apparatus 200 shown in FIG. 2, the image capture system 300 shown in FIG. 3A, or the image capture system 330 shown in FIG. 3B. As shown in FIG. 13, the image 1300 includes an image circle portion 1310 and dark corner areas 1320. The dark corner areas 1320 are areas along concentric circles measured outside the image circle portion 1310. The dark corner areas 1320 are not available along the entire image border, resulting in gaps 1330 in areas along the image border. The gaps 1330 may be around areas where the image border is tangent to the image circle portion 1310.

In order to compensate for the gaps 1330, the dark corner areas 1320 are transformed into a profile along the entire image circle. The transformation from a raw dark corner observation to an estimator may include filling the gaps, regularizing, or both. Filling the gaps may include a linear interpolation between each end. Regularizing may include a convolution with two Gaussian kernels, for example, using Equation (15) below.

$$D_{reg} = k_{narrow}(D_{filled} \otimes \text{gauss}(\sigma_{narrow})) + k_{wide}(D_{filled} \otimes \text{gauss}(\sigma_{wide})) \quad \text{Equation (15)}$$

The flare profile estimation may include two input types. For example, a first input type may be the intensity difference along the stitch line, and the second input type may be the corner observations and the derived estimator. The intensity difference along the stitch line may carry information about the true flare difference level along the stitch line. The intensity difference along the stitch line may be noisy due to the image zones with a strong intensity gradient. The intensity difference along the stitch line may be biased due to mismatches on the stitch line. The intensity difference along the stitch line may be incomplete due to saturation.

The corner observations may carry information about a belief in flare intensity. In this example, the accuracy of the flare difference level may decrease with intensity. The estimate is derived from partial information and may be biased by specular reflections in the barrel of the image capture device.

In order to derive an accurate flare difference estimate, two types of observations may be used. For example, a flare estimation filter may employ a strategy that includes using the corner estimator in the areas where the accuracy is the highest. For example, the flare estimation filter may use the zones where there is a strong belief that there is no flare. The flare estimation filter may employ a strategy that includes quantifying the actual flare level on the intensity differences along the stitch line. The flare estimation filter may be run in a forward direction and a backward direction.

The estimation process may be an iterative two-operation procedure. In a first operation, a flare level at sample $\theta_{i+1}$ may be predicted to assess whether observations at $\theta_{i+1}$ are usable, for example, not saturated. In a second operation, the flare level at sample $\theta_{i+1}$ is updated. The procedure to predict the flare level may be performed using Equation (16) to Equation (18) below.

$$\hat{x}_{i'} = (1 - k_i)\hat{x}_{i-1} + k_i s_{i-1} d_i \quad \text{Equation (16)}$$

$$\hat{P}_{i'} = (1 - k_i)^2 \hat{P}_{i-1} + k_i^2 s_{i-1}^2 B_i + u \quad \text{Equation (17)}$$

$$B_i = \frac{1}{w}\sum_{k=-\frac{w}{2}}^{\frac{w}{2}} d_{i+k}^2 - \left(\frac{1}{w}\sum_{k=-\frac{w}{2}}^{\frac{w}{2}} d_{i+k}\right)^2 + d_i^2 \quad \text{Equation (18)}$$

The procedure to update the flare level may be performed using Equation (19) to Equation (23) below, in the case where the intensity difference at vertex I is known (i.e., where $z_i \neq$ nan).

$$K = \frac{\hat{P}_{i'}}{\hat{P}_{i'} + v_i} \quad \text{Equation (19)}$$

$$v_i = \frac{1}{w}\sum_{k=-\frac{w}{2}}^{\frac{w}{2}} l_{i+k}^2 - \left(\frac{1}{w}\sum_{k=-\frac{w}{2}}^{\frac{w}{2}} l_{i+k}\right)^2 + l_i^2 \quad \text{Equation (20)}$$

$$\hat{x}_i = \hat{x}_{i'} + K(m_i - \hat{x}_{i'}) \quad \text{Equation (21)}$$

$$\hat{P}_i = (1 - K)\hat{P}_{i'} \quad \text{Equation (22)}$$

$$s_i = \frac{\hat{x}_i}{d_i} \quad \text{Equation (23)}$$

In the above Equations (19)-(23), β denotes a spatial smoothing coefficient for the scales In an example, β can be 0.8 for a stitch line resolution of 1024 points. If no observation is available (i.e., $z_i$=nan), then the predicted values can be calculated using Equation (24) to Equation (26).

$$\hat{x}_i = \hat{x}_{i'} \quad \text{Equation (24)}$$

$$\hat{P}_i = \hat{P}_{i'} \quad \text{Equation (25)}$$

$$s_i = s_{i-1} \quad \text{Equation (26)}$$

Referring to FIG. 10, at block 1045, a mask is computed to create a flare mask profile from the flare difference estimation along the stitch line. This flare mask profile is mapped onto the image circle and then diffused towards the center of the image. The diffusion is performed in a (theta, radius) space. The diffusion is performed by initializing the grid per channel using Equation (27) below.

$$\begin{cases} m_0(\theta, r) = \text{start value for } r > 0 \\ m_0(\theta, 0) = F(\theta) \text{ for } r = 0 \end{cases} \quad \text{Equation (27)}$$

where start value = average($F(\theta)$)

Upon initialization of the grid per channel, diffusion per channel is performed. The diffusion may be performed by computing the pixel value from a neighbor pixel value for the next iteration using Equation (28) below, which can be an iterative process.

$$m_{n+1}(\theta,r) = 0.25 * m_n(\theta, r+dr) + 0.25 * m_n(\theta, r-dr) + 0.25 * m_n(\theta+d\theta, r) + 0.25 * m_n(\theta-d\theta, r) \text{ for } r > 0$$

$$m_{n+1}(\theta, 0) = m_n(\theta, 0) = F(\theta) \text{ for } r = 0 \quad \text{Equation (28)}$$

As can be seen from Equation (28), values at r=0 are unchanged through the iterative process to maintain the flare values at the stitch line position. Once the diffused grid is computed, a warp function may be performed to return to a square image space (per channel). In an example, the diffusion weights can be pre-calculated to optimize the processing time. In this example, the resulting correction mask for each side may be:

$$\text{mask}_{back} = \max(0, \text{warp}_{(r,\theta) \mapsto (x,y)}(m))$$

$$\text{mask}_{front} = -\min(0, \text{warp}_{(r,\theta) \mapsto (x,y)}(m))$$

Referring to FIG. 10, once the masks are computed, image correction may be performed at block 1050. In the examples disclosed herein, the flare being considered is an additive effect, and therefore the correction may be a subtraction of the mask from the original image. Prior to the subtraction of the mask, the mask may be scaled back to the original exposure according to Equation (29) below.

$$\hat{f} = \text{satfromoriginal}\left(f - \text{mask}_{side} * \frac{EV_{side}}{EV_{target}}, f\right) \quad \text{Equation (29)}$$

Once the mask is subtracted, the zones that were saturated in the original image are returned to saturation using Equation (30) below.

$$\text{satfromoriginal}(v, v_{original}) = \quad \text{Equation (30)}$$
$$\begin{cases} \text{saturation limit if } v_{original} \geq \text{saturation limit} \\ v \end{cases}$$

In the flare compensation processes, techniques, and systems described above, the color was determined by examining differences in an overlap area (more especially, along the stitch line) between front and back lenses. However, such flare compensation can require a near-perfect alignment of both (e.g., the front and back) sensors in terms of color. For example, the alignment can be with respect to most of the white balance per unit, color lens shading (CLS), luminance lens shading (LLS), and the like, and in terms of geometry and stitching.

In other implementations, flare compensation, and as further described below, can be performed with respect to, or based on the luminance channel, instead of the RGB color channels. For ease of reference, flare compensation based on the RGB channels, which is described above, is referred to herein as the RGB version (of flare compensation); and flare compensation based on the luminance channel, which is described below, is referred to herein as the Luminance version.

In the Luminance version, RGB image values are converted to YUV values; a flare estimation algorithm is applied to the YUV channels; the flare estimate is then converted to RGB; and flare correction is applied to the RGB image values. Different flare estimations can be generated for the Y component as compared to the U and V components.

The Luminance version can be summarized as follows. The black corners, which are outside of the image circle, are used in the flare algorithm (as described above with respect to the RGB version) to avoid false positive of flare while looking at intensity differences only. These black corners can convey a good estimation of the flare color itself. In the Luminance version, the flare color can be estimated using these black corners. Subsequently, the estimation of the flare using the differences between the front and back lenses can be simplified to an estimation of the amplitude of the flare based only on the measurement of the luminance. Once a luminance intensity profile is determined, the luminance profile can be transformed back to colored correction by reapplying previously estimated color on the colored correction.

Differences between the RGB version and the Luminance version are now summarized. Whereas the RGB version uses independent estimations on each of RGB channels, the Luminance version performs estimation on the Luminance channel only. Whereas the RGB version performs a linear mix of colors between front and back lenses, the Luminance version uses the dark corner color corresponding to the lens where the flare correction is applied. Whereas the RGB version uses independent RGB scale factors between dark corner and ring intensities, the Luminance version uses only 1 scale factor in Luminance between dark corners and ring intensities. Whereas in the RGB version color artefacts (such as the CLS) that can appear along the stitch line but are not related to flare, can introduce bias in the flare estimation, in the Luminance version such color artefacts do not introduce color bias in the final result. It is noted that in the Luminance version, such color artefacts may only produce a slight intensity bias because the final flare color component depends only on the color of the dark corners on the lens that is corrected. Finally, whereas in the RGB version, the scales between the dark corners and the ring profiles are not spatially filtered, in the Luminance version, the scales between the dark corners and the ring profiles are filtered spatially.

The following abbreviations or symbols may be used. RB (f, b) or $RB_{fb}$ refers to Raw Bayer fisheye images for front camera (denoted $RB_f$) and the back camera (denoted $RB_b$) from a 360 degree device camera. BL denotes for Black Level value. SAT denotes the Saturation value. Cb (f, b) or $Cb_{fb}$ denote the calibration information of the camera. The calibration information can be used to compute the optical centers and image projection radii for each Raw input of the front and back cameras. SL (f, b) or $SL_{fb}$ denotes the Stitch lines, in raw Bayer coordinates, with a given resolution (e.g., 1024 points or some other resolution), for the front and back images. EV (f, b) or $EV_{fb}$ denotes the Exposure Values (EV) for front and back cameras. WBPU (f, b) or $WBPU_{fb}$ denotes the Per-unit White Balance scales for the front and back cameras. LLS (f, b) or $LLS_{fb}$ denotes the Luminance Lens Shading (LLS) radial values for the front and back cameras. CLS (f, b) or $CLS_{fb}$ denotes the Color Lens Shading maps (CLS) for the front and back cameras. LCA denotes the Lateral Chromatic Aberrations coefficients.

Figure 14:
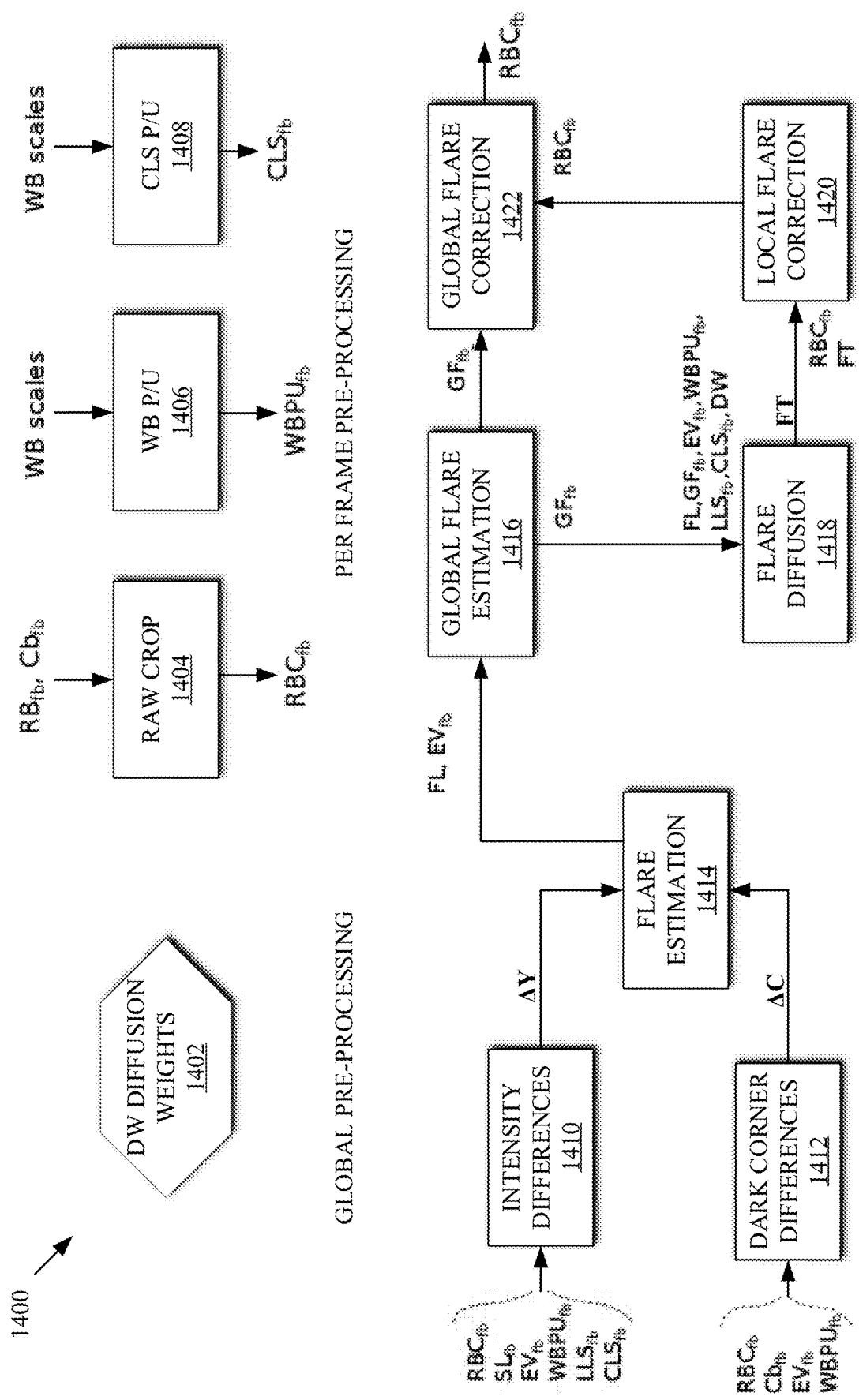
FIG. 14 is a diagram of an example of block diagram of modules of flare compensation in accordance with an implementation of this disclosure.

FIG. 14 is a diagram of an example 1400 of block diagram of modules of flare compensation in accordance with an implementation of this disclosure. In some implementations, some of the modules may not be available. In some implementations, some of the modules may be combined. In some implementations, the functionality of one module may be partially or fully performed by one or more other modules. In some implementations, other modules may be available.

The example 1440 illustrates that one or more pre-processing steps may be performed on an image or a pair of images before flare compensation is performed. The pre-processing steps can include global pre-processing. The pre-processing can be performed to ensure that any color differences that are observed are linked (i.e., are due) to flare and are not due to color per unit differences or field-variable differences. The pre-processing can include zero or more of white balance compensation, luminance lens shading, color alignment, other pre-processing processes, or a combination thereof. The pre-processing can be performed either on the images (the front and back images; or a first and a second image) before computing the flare or directly on the statistics that are used to compute a flare profile. The pre-processing can include per-frame (e.g., image) pre-processing. Global pre-processing can be performed by a module 1402. Per-frame pre-processing can be performed by one or more of a module 1404, a module 1406, a module 1408, other modules, or a combination thereof.

The module 1402 pre-computes diffusion weights (DW). The diffusion weights can be saved, such as to a file or some other permanent memory, so that they can be applied later. The diffusion weights (DW) are applied, such as for each sub-resolution pixel, on a local flare profile in RGB (e.g., on each of the R, G, and B channels) to obtain a local flare mask. Flare reduction can be applied on all channels or a subset thereof. A such, the diffusion can be applied on all of the RGB channels or a subset thereof. However, and as further described below, the flare profile computation can benefit from an intermediate state where one single flare profile on luminance is computed and then a color conversion is applied on the single flare profile to build three (3) RGB profiles based on an estimate of the flare color.

The module 1402 can receive, as inputs, a radius from which diffusion starts, a mask resolution, a profile resolution, more, fewer, other inputs, or a combination thereof. The module 1402 outputs the diffusion weights (DW). The diffusion weights (DW), as further explained below, are used to diffuse the flare from the stitch line to the inner image disk (i.e., image circle). As already mentioned, the image circle is the inner part of the fisheye lens projection on the sensor. That is, the fisheye is projected as a disk on the sensor and the outer part of that disk corresponds to no data (except for possible reflections from mechanical parts of the camera); the inner part of the disk corresponds to the image that is captured by the lens part. The diffusion weights can be pre-processed independently of a calibration process of the camera. Calculating the diffusion weights can be a costly (i.e., time-consuming) operation. As such, pre-computing the diffusion weights can improve real-time image processing, such as for flare reduction. The diffusion weights (DW) can be independent of the fisheye front or back.

As compared to the resolution of the image to which flare reduction is to be applied, the diffusion of the flare can be done at a lower resolution grid using, for example, image pixels of 32×32 original Bayer pixels. For example, a low-resolution flare map can be built from the flare profile along the stitch line; the low-resolution flare map can then be diffused in the image circle toward the center of the image; subsequently, the low-resolution map can be interpolated to the resolution of the image before applying low-resolution map. In an example, a bilinear interpolation filter can be used for the interpolation.

In another implementation, the images (the front and back images) can be divided into several tiles. For each of the tiles, four (4) flare values per channel can be provided. Each of the four flare values corresponds to a corner of the tile. The flare value for a pixel inside the given tile can therefore be computed by performing a bilinear interpolation of the flare values from the corners of the tile. As such, it is possible to correct a subset of the tiles. For example, it is possible to correct the areas of the images with the most flare. For example, a list of the tiles (e.g., areas of the images) to be corrected and associated flare values can be provided to a flare correction block (e.g., module, etc.). Correcting only a subset of the images can be useful in reducing bandwidth consumption.

The module 1404 receives, as inputs, the Raw Bayer fisheye front and back images (i.e., $RB_f$ and $RB_b$, or jointly $RB_{fb}$) and the calibration information of the front and back cameras (i.e., $Cb_f$ and $Cb_b$, or jointly $CB_{fb}$). The module 1404 outputs a front and back Raw Bayer Cropped images (i.e., $RBC_f$ and $RBC_b$, or jointly $RBC_{fb}$). The module 1404 can crop the original Raw Bayer images (e.g., $RB_{fb}$) from a rectangular shape to a square shape so that the optical center is placed at the centers of the cropped images. In an example, the square shape can be 3008×3008, or some other square shape. The module 1404 can update the calibration information of the front and back sensors (e.g., cameras) to correspond to the respective cropped raw Bayer images.

The module 1406 receives, as input, the white balance (WB) scales. The white balance per-unit (i.e., per-sensor unit) correction scales to be applied on each sensor image, as described below, can depend on the current White Balance illuminant, and are interpolated based on an auto white balance (AWB) algorithm per-unit calibration. To illustrate, two illuminants may be calibrated (such as during the camera manufacturing process). The two illuminants correspond to two different color temperatures. During the calibration process, some correction scales may be determined and are then applied to each sensor so that images from these calibrated sensors can look alike given a reference sensor (known as the "golden" sensor). Due to this calibration process, images from calibrated cameras look like each other (in terms of color) despite per unit variations. As such, aligning the sensors of the front and back lenses can ensure that no color differences are visible on the stitch line. However, these scales are appropriate for the illuminant the lenses are calibrated on. Therefore, it is desirable to adapt these scales to other kinds of illuminants in the AWB algorithm to take them into account. Thus, the proper per unit WB gains for the current illuminant can be taken into account in flare reduction. To reiterate, the white balance (WB) scales can result from the calibration process. In an example, the white balance (WB) scales can be included in the metadata. As such, the module 1406 outputs the white balance scales per unit for each of the front sensor and the back sensor (i.e., $WBPU_f$ and $WBPU_b$, or jointly $WBPU_{fb}$).

The module 1408 interpolates the color lens shading (CLS) per unit maps based on the current WB illuminant. As such, the module 1408 can receive, as input, the white balance (WB) scales and output the color lens shading maps for the front and back lenses, respectively (i.e., $CLS_f$ and $CLS_b$, or jointly $CLS_{fb}$).

Figure 15:
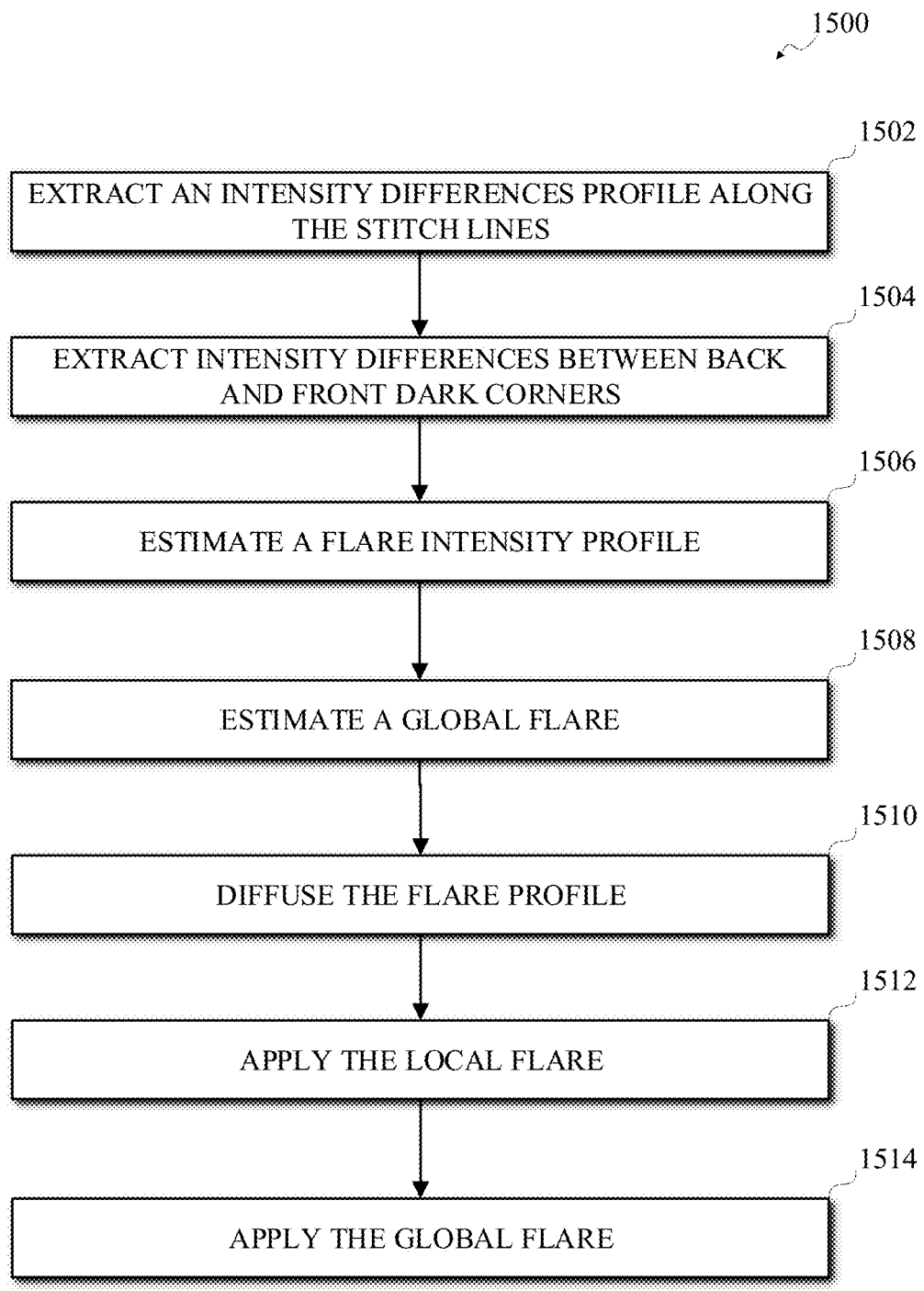
FIG. 15 is a flowchart of a technique for flare compensation in accordance with an implementation of this disclosure.

FIG. 15 is a flowchart of a technique 1500 for flare compensation in accordance with an implementation of this disclosure. The technique 1500 is a flare compensation process according to the Luminance version. The technique 1500 can include extracting 1502 an intensity differences profile along the stitch lines of the back and front images; extracting 1504 intensity differences between back and front dark corners; estimating 1506 a flare intensity profile; estimating 1508 a global flare; diffusing 1510 the flare profile from the stitch line to the inside of the image projection disk; applying 1515 a local flare; and applying 1514 the global flare. The technique 1500 can include more or fewer steps. Each of the steps is explained below with respect to a module of FIG. 14 that can carry out the step. However, modules and/or steps can be combined and/or the steps performed by other modules.

The technique 1500 can be summarized as estimating the flare on the stich line between two images: a first image from a first camera (e.g., a front camera) and a second image from a second camera (e.g., a back camera). A global flare component and a local flare component can be extracted (e.g., calculated) from the flare estimate. The global flare can be considered an average flare to be removed from an image. Removing the global flare component enables the reduction of the area on which a local flare component is to be removed. Removing the global flare can improve the cost of the flare reduction algorithm since removing a global flare is inexpensive as compared to removing a field variable (i.e., local) flare. Color flare from dark corners is then used to convert back a luminance flare profile to an RGB flare profile by estimating the color of the flare and applying it to the luminance flare profile to obtain chrominance U and chrominance V flare profiles. Once the Y, U, and V flare profiles are obtained, a conversion from YUV to RGB can be applied to correct the flare in the RGB domain.

At 1502, the technique 1500 extracts the intensity differences profile (denoted DI) along the stitch line. The step 1502 can be performed by a module 1410 of FIG. 14. The technique 1500 can extract the intensity difference profile (DI) at least partially as described above with respect to the RGB version. The module 1410 (e.g., the step 1502) can receive, as inputs, the Raw Bayer Cropped images ($RBC_{fb}$), the stitch lines SL, the exposure values ($EV_{fb}$), the white balance scales per unit ($WBPU_{fb}$), the Luminance Lens Shading ($LLS_{fb}$), the Color Lens Shading maps (CLS), the Lateral Chromatic Aberrations coefficients ($LCA_{fb}$), the Saturation value (SAT), the Black Level value (BL), fewer inputs, more inputs, other inputs, or combination thereof. The module 1410 outputs the intensity difference profile (DI) along the stitch line. The step 1502 is further described with respect to FIG. 16.

At 1504, the technique 1500 extracts intensity differences between back and front dark corners. The step 1502 can be performed by a module 1412 of FIG. 14. The module 1412 (e.g., the step 1504) can receive, as inputs, the Raw Bayer Cropped images ($RBC_{fb}$), the exposure values ($EV_{fb}$), the cameras calibration information ($Cb_{fb}$), the white balance scales per unit ($WBPU_{fb}$), more inputs, fewer inputs, other inputs, or a combination thereof. The module 1412 outputs the dark corner intensity differences profile (DC) for positions outside the image disk, which are at constant radial distances from the center and at angles equivalent to the stitch line angles. The step 1504 is further described with respect to FIG. 18.

At 1506, the technique 1500 estimates a flare intensity profile. The step 1506 can be performed by a module 1414 of FIG. 14. The module 1414 (e.g., the step 1506) can receive, as inputs, the intensity difference profile (DI) that is extracted by the module 1410, the dark corner intensity differences profile (DC) that is extracted by the module 1412, more inputs, other inputs, or a combination thereof. The module 1414 outputs the flare intensity profile (FL). The flare intensity profile (FL) is the flare RGB profile, which includes signed values where the sign depends on lens (e.g., whether the front or the back camera) of the estimated flare. The step 1506 is further described with respect to FIG. 21.

At 1508, the technique 1500 estimates a global flare. The global flare can be or can include global flare RGB values for each of the front and back lenses. The global flare is denoted GF(f, b) or $GF_{fb}$. The step 1508 can be performed by a module 1416 of FIG. 14. The module 1416 (e.g., the step 1508) can receive, as inputs, flare intensity profile (FL) estimated by the module 1414, the exposure values ($EV_{fb}$), more inputs, other inputs, or a combination thereof. The module 1416 outputs the global flare ($GF_{fb}$).

At 1510, the technique 1500 diffuses the flare profile. The flare profile can be diffused from the stitch line to an inside of the image projection disk. The step 1510 can be performed by a module 1418 of FIG. 14. The module 1418 (e.g., the step 1510) can receive, as inputs the flare intensity profile (FL), the global flare ($GF_{fb}$), the exposure values ($EV_{fb}$), the per-unit White Balance scales ($WBPU_{fb}$), the Luminance Lens Shading values ($LLS_{fb}$), the Color Lens Shading maps ($CLS_{fb}$), the diffusion weights (DW), more inputs, fewer inputs, other inputs, or a combination thereof. The module 1418 outputs a local flare mask (FT) in RGB to be applied on each sensor raw image. Two local flare masks ($FT_f$ and $FT_b$, or collectively $FT_{fb}$) can be generated (e.g., obtained, calculated, estimated, etc.) depending on where the flare source(s) is(are) located. For example, if several sources of light causing flare are located on both sides of the camera, some tiles can be corrected on the front and the back lenses. The local flare mask can be stored as a list of tiles. The list of tiles generated can include the coordinates of the tiles, the images on which the mask should be applied, the flare values on its 4 corners for every channel, more, fewer, other information, or a combination thereof.

At 1512, the technique 1500 applies the local flare to each of the images. More specifically, the technique 1500 corrects the images based on the respective local flare masks. The step 1512 can be performed by a module 1420 of FIG. 14. The module 1420 (e.g., the step 1512) can receive, as inputs, the Raw Bayer Cropped images ($RBC_{th}$) that are generated by the module 1404 of FIG. 14 and the local flare mask ($FT_{th}$) that is generated by module 1418.

At 1514, the technique 1500 applies the global flare. That is, the technique 1500 corrects at least one of the front image or the back image to account for the global flare. The step 1514 can be performed by a module 1422 of FIG. 14. The module 1422 (e.g., the step 1514) can receive, as inputs, the global flare ($GF_{th}$) that is output from the module 1416 and the Raw Bayer Cropped images ($RBC_{th}$) that are generated by the module 1404 of FIG. 14. The module 1422 outputs Raw Bayer Cropped images that are corrected from the global flare value.

Figure 16:
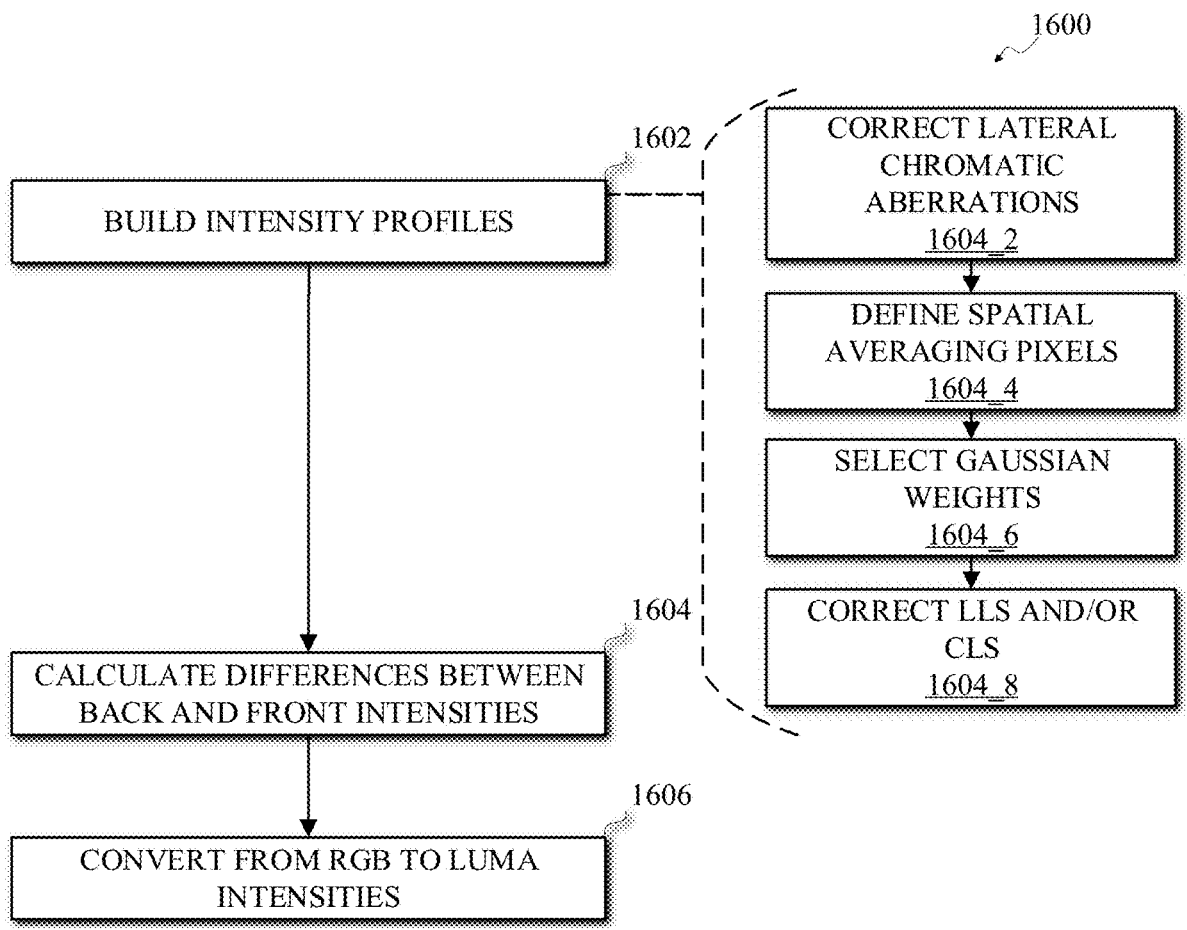
FIG. 16 is a flowchart of a technique for extracting an intensity differences profile in accordance with an implementation of this disclosure.

FIG. 16 is a flowchart of a technique 1600 for extracting the intensity differences profile in accordance with an implementation of this disclosure. Extracting the intensity differences profile can include building 1602 intensity profiles in each sensor image; calculating 1604 differences between back and front intensities; and converting 1606 from RGB to luminance intensities.

Building 1602 the intensity profiles in each sensor image can be as described with respect to the RGB version. As such, at 1602, the technique 1600 can receive as inputs the Raw Bayer Cropped images ($RBC_{th}$), the stitch lines SL, the Luminance Lens Shading (LLS), the Color Lens Shading maps (CLS), the Lateral Chromatic Aberrations coefficients ($LCA_{th}$), and the Saturation value (SAT). At 1602, the technique 1600 outputs the intensity difference profile (DI) along the stitch line.

Building 1602 intensity profiles in each sensor image can in turn include correcting 1604_2 Lateral Chromatic Aberrations; defining 1604_4 spatial averaging pixels; selecting 1604_6 Gaussian weights; and applying 1604_8 Luminance Lens Shading (LLS) and/or Color Lens Shading (CLS) corrections.

At 1604_2, the technique 1600 corrects the lateral chromatic aberrations. Correcting the lateral chromatic aberrations can be as described with respect to block 1020 of FIG. 10. To correct the lateral chromatic aberrations, the stitch line can be split into its red, green, and blue components. The red and blue components in each image can be shifted, based on the LCA information.

At 1604_4, the technique 1600 defines the spatial averaging pixels. The green Bayer components Gr and Gb can be averaged. If any of the pixels to be average is determined to be saturated, the average is itself considered as saturated. The RGB values can be interpolated using a defined interpolation method. In an example, the defined interpolation method can be the nearest neighbors method in which the pixel value of the neighboring pixels along the stich line of a pixel for which an average is to be determined are considered.

For each point of the stitch line (SL), a set of neighbor positions are defined for intensity averaging. An average half distance (AHD) between 2 successive points of the stitch line are defined based on the image radius and on the number of points of the stitch line.

Figure 17:
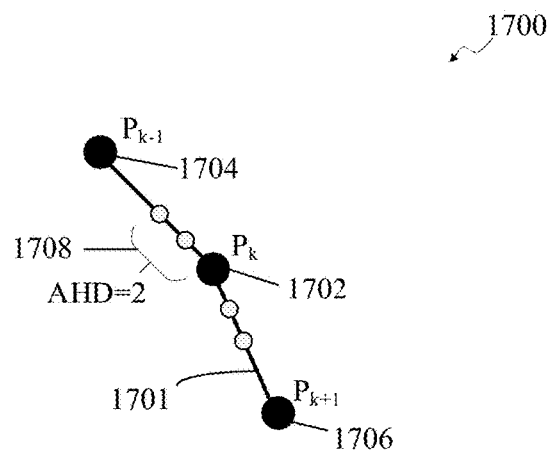
FIG. 17 is an example of a neighboring pixels in accordance with implementations of this disclosure.

FIG. 17 is an example 1700 of a neighboring pixels in accordance with implementations of this disclosure. The example 1700 illustrates an average half distance (AHD) that is equal to two (2). That is, two neighboring positions on each side along the stitch line 1701 of a point 1702, for which an average is to be determined, are considered. The example 1700 illustrates the immediately preceding point 1704 along stitch line and the immediately succeeding point 1706. The stitch line may not be one single line. The stitch line can be a set of positions in the images describing where the fisheye of one camera should be cut off in order to perfectly match with the other fisheye of the other camera. This stitch line can be described at a pixel level. That is, the stitch line can be a set of connected pixels. The stich line can also be subsampled or computed at a lower resolution, for complexity constraints.

In an example, the AHD value can be 2 for still images. In an example, the AHD value can be 14 for videos. Other values are possible. In an example, (2*AHD+1) points can be used to compute the average intensity value of each point of the stitch line. The (2×AHD+1) points correspond to two AHD points on one side of the point, two AHD points on the other side of the point, and the point itself. In an example, the maximum number to points to averaged can be set to 9. As such, AHD can be set to no greater than a value of 4. In an example, 5 points can be averaged for still images. In an example, 9 points can be averaged for videos.

Returning to FIG. 16. At 1604_6, the technique 1600 selects weights for the averaging operation. The weights can be Gaussian weights. The Gaussian weights can be applied respectively, during the averaging operation, to the pixel positions defined at 1604_4. That is, the averaging can use a Gaussian kernel to weight the intensity values based on their distance to the central point (i.e., the point, such as the point 1702 of FIG. 17, for which is average is to be calculated). In an example, other than Gaussian weights can be selected.

In an example, saturated pixels (i.e., pixels having values >=SAT) are not included in the averaging. In an example, if the total weight of non-saturated pixels is lower than 0.5, then the resulting intensity profile value can be set as saturated (i.e., the average value is set equal to SAT).

At 1604_8, the technique 1600 corrects at least one of the luminance lens shading (LLS) or the color lens shading (CLS). The luminance lens shading can be corrected as described with respect to 1022 of FIG. 10. CLS can be corrected using a field variable gain for each channel stored as a low-resolution gain map. As CLS variates according to the position of a current pixel within the image circle, a gain map can be interpolated to compute the proper correction for the current pixel.

Output of the technique 1600 at 1602 can include the average intensities along the stitch lines for the front image and the back image. Let $SLI_f(k)$ denote the average intensities along the stitch line for the front image and let $SLI_b(k)$ denote the average intensities along the stitch line for the back image, where k in [0, N−1] and where N is the number of points of each stitch line.

At 1604, the technique 1600 calculates the differences between back and front intensities. In an example, the intensity profiles can be aligned in exposure to a maximal exposure. The maximal exposure can be calculated using $EV_f$ and $EV_b$, which denote, respectively, the exposure values for front and back lenses:

$$EV_{max} = \max(EV_f, EV_b)$$

If any of the values of the average intensities front ($SLI_f$) or back ($SLI_b$) at point k is saturated, the difference can be set to a special IGNORE value; otherwise, the intensity difference can be computed using equation (31).

For $k \in [0, N-1]$ (31)

$$SLI'_b(k) = (SLI_b(k) - BL) \cdot WBPU_b \cdot LLS_b(k) \cdot CLS_b(k) \cdot \frac{EV_{max}}{EV_b}$$

$$SLI'_f(k) = (SLI_f(k) - BL) \cdot WBPU_f \cdot LLS_f(k) \cdot CLS_f(k) \cdot \frac{EV_{max}}{EV_f}$$

$$DI(k) = SLI'_b(k) - SLI'_f(k)$$

DI(k) of equation (31) denotes the calculated differences between back and front intensities. As mentioned above, N denotes the number of points of each stitch line; $SLI_f(k)$ and $SLI_b(k)$, for k in [0,N−1], denote, respectively, the average intensities along the stitch lines of the front and back images; $EV_f$ and $EV_b$ denote, respectively, the exposure values for front and back lenses; $LLS_f(k)$ and $LLS_b(k)$, for k in [0,N−1], denote, respectively, the luminance lens shading values to apply at the positions k of the front and back stitch lines; BL denotes the black level value; and $WBPU_f$ and $WBPU_b$ denote the white balance per-unit scales to apply to the front and back lenses.

At 1606, the technique 1600 converts the RGB values to luminance (i.e., luma) intensities. For each stitch line point, the values of the intensity difference profile (DI) calculated at 1502 can be stored as RGB vectors. The technique 1660 can convert the RGB values to scalar Luma (Y) values using a function RGB2Y( ), which returns a luminance value as a linear combination of the RGB input values. As such luminance difference values are calculated using equation (32):

$$\Delta Y(k) = RGB2Y(DI(k)), \text{ for } k \in [0, N-1] \quad (32)$$

In equation (32), $\Delta Y$ can also be referred to as the ring differences in Y (i.e., the ring differences of the luminance component).

Figure 18:
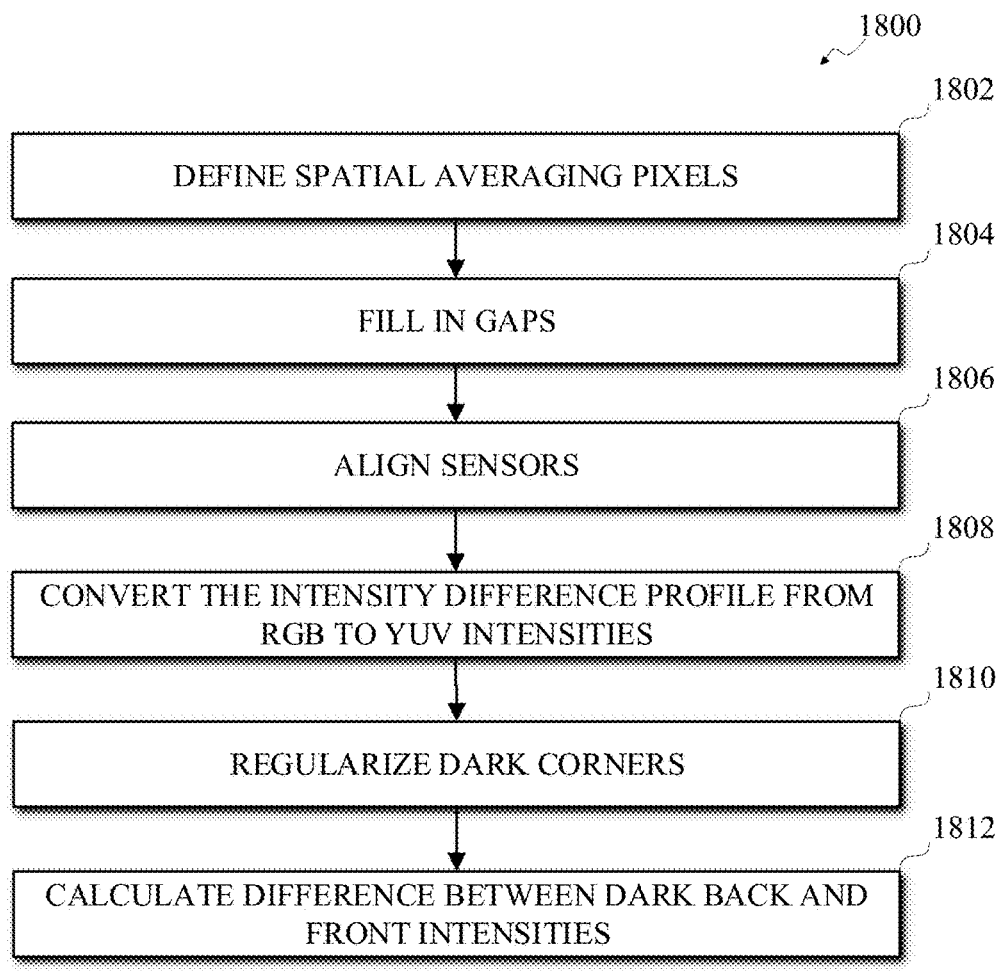
FIG. 18 is a flowchart of a technique for extracting intensity differences between back and front corners in accordance with an implementation of this disclosure.

FIG. 18 is a flowchart of a technique 1800 for extracting intensity differences between back and front dark corners in accordance with an implementation of this disclosure. The technique 1800 can include defining 1802 spatial averaging pixels; filling in 1804 gaps; aligning 1806 sensors; converting 1808 from RGB to YUV intensities; regularizing 1810 dark corners; and calculating 1812 difference between dark back and front intensities.

At 1802, the technique 1800 defines the spatial averaging pixels. That is, the technique 1800 defines which dark pixels are to be averaged. Dark corners can be extracted at 8 (or more or fewer) concentric circles centered at the position of the optical center and with radii varying linearly between the image radius +90 pixels and the image radius +110 pixels. The optical center can be obtained from the calibration information (Cb).

Figure 19:
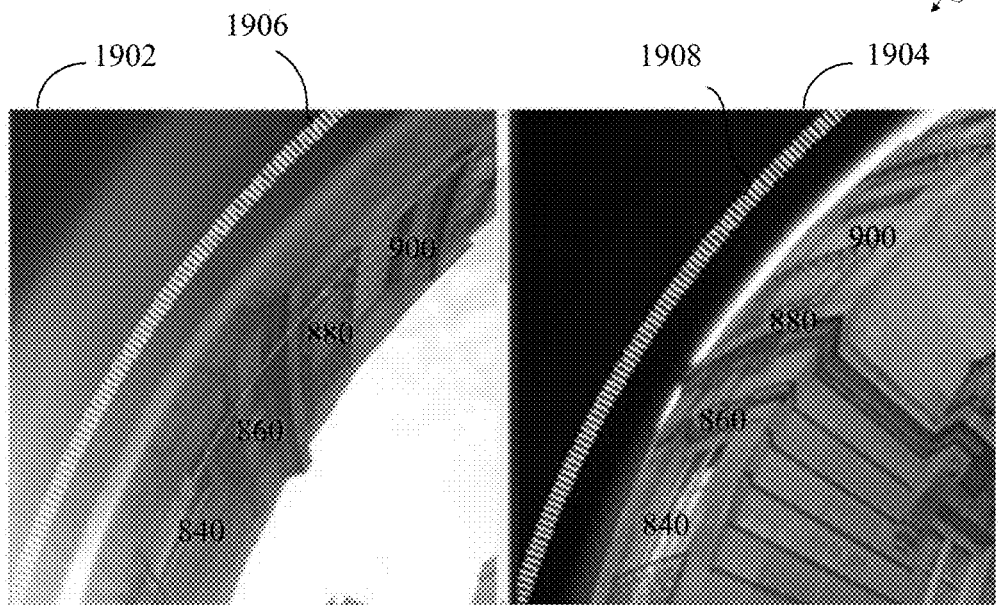
FIG. 19 is an example of positions of dark corner points to be averaged in accordance with implementations of this disclosure.

FIG. 19 is an example 1900 of positions of dark corner points to be averaged in accordance with implementations of this disclosure. The example 1900 includes a first image 1902 and a second image 1904. The first image 1902 can be a front image and the second image can be a back image, or vice versa. A group 1906 of pixels illustrates positions of the dark corner points in the first image 1902 and which are to be averaged. A group 1908 of pixels illustrate positions of the dark corner points in the second image 1904 and which are to be averaged. That is, each of the illustrated white line segments (groups of pixels) of the first image 1902 corresponds to pixels that are to be averaged to compute the statistics; and similarly for the line segments of the second image 1904.

Intensity average and variance among the 8 radial pixels close to the central position of the dark corner are calculated. Values outside the cropped raw image can be set to INVALID (i.e., undefined, a mask of invalid values). If any pixel value is INVALID, the average and variance at the given position are also set to INVALID. Otherwise, average and variance are calculated among non-saturated values. If all the values are saturated, the results is set to INVALID.

Returning to FIG. 18, at 1804, the technique 1800 fills in gaps. The gaps are defined as those areas where the image border is tangent to the image circle. That is, the gaps are those areas of the image border where dark corner measurements are not available. Said another way, the gaps are defined as those areas where the dark corner extraction circles are outside the image definition domain. As mentioned above with respect to the RGB version and FIG. 13, dark corner measurements are not available along the entire image border. Yet it is desirable to transform the corner observations into a complete intensity difference profile for the entire image circle. All values calculated as INVALID in the step 1802 can be filled (e.g., estimated, etc.) using a gap filling algorithm using linear interpolation between non-INVALID extremity values of INVALID areas. To illustrate, consider a circle that is drawn around the smallest square image that includes the image circle, where the circle has a radius superior to the image circle radius but inferior to sqrt(2) times the image circle radius. The circle will be drawn in the corners but will be outside of the image on the top, left, bottom and right sides of the square. The values of the pixels on this circle can be represented in polar coordinates via a graph v=f(θ). Some values along the circle can be plotted; but some others are invalid. An interpolation between the valid values and invalid values can be performed to get data for all θ values. As such, the transformation from raw corner observations to an estimator can rely (e.g., use, etc.) on filling the gaps.

Using the defined spatial pixels to be averaged and the filled in gap values, the technique 1800 averages the dark corner intensities for each of the front and back images to obtain the average intensities of the dark corners of the front and the back images, $C_f(k)$ and $C_b(k)$ for k in [0, N−1]. The averaging can be performed while processing the dark corners.

At 1806, the technique 1800 aligns the sensors. That is, the technique 1800 aligns the average intensities of the dark corners ($C_f$ and $C_b$) in exposure to one with the maximal exposure value $EV_{max}$ to obtain dark corner intensity alignment $C_b'$ and $C_f'$. $EV_{max}$ can be calculated as mentioned above using $EV_{max}=\max(EV_f, EV_b)$, where $EV_f$ and $EV_b$ denote, respectively, the exposure values for front and back lenses. As compared to the RGB version, which only uses the differential information on dark corners to check if there is flare or not on the image, the Luminance version also uses the absolute value in the dark corners as an estimator of the hue of the flare. As such, DC' (which is calculated as described above with respect to the RGB version) and $C_f'$ and $C_b'$ are computed by the Luminance version.

The dark corner intensity alignment can be computed using equation (33):

For $k \in [0, N-1]$ (33)

$$C_b'(k) = (C_b(k) - BL) \cdot WBPU_b \cdot \frac{EV_{max}}{EV_b}$$

$$C_f'(k) = (C_f(k) - BL) \cdot WBPU_f \cdot \frac{EV_{max}}{EV_f}$$

As mentioned above, N denotes the number of points of each stitch line; $C_f(k)$ and $C_b(k)$, for k in [0,N−1] denote the respective average intensities of the dark corners of the front image and the back image; $EV_f$ and $EV_b$, denote, respectively, the exposure values for front and back lenses; BL denotes the black level value; and $WBPU_f$ and $WBPU_b$ denote the white balance per-unit scales to apply to the front and back lenses.

At 1808, the technique 1800 converts the intensity difference profile (DI) from RGB to YUV intensities. As further described below, for the dark corners, the YUV of each lens and the Y component of the intensity difference profile (DI) are used for flare estimation.

The dark corner intensity alignment $C_b'$ and $C_f'$ values are stored as RGB vectors for at least some (e.g., each) of the stitch line points. The RGB vectors are converted to scalar luminance Y and chrominance U and V values using equation (34):

$$C_{b,YUV}'(k)=RGB2YUV(C_b'(k))$$

$$C_{f,YUV}'(k)=RGB2YUV(C_f'(k))$$ (34)

In equation (34), the function RGB2YUV( ) corresponds to a 3×3 matrix multiplication from the input RGB vector.

At 1810, the technique 1800 regularizes the dark corners. The transformation from raw corner observations to an estimator (i.e., an estimator of both the presence of flare and its color) can rely on regularizing by convolution with two Gaussian kernels G(s) of standard deviation s, for each of the front (i.e., $C_f^*$) and back (i.e., $C_b^*$) lenses as shown in equation (35).

$$C^*=k_{narrow}(C' \otimes G(\sigma_{narrow}))+k_{wide}(C' \otimes G(\sigma_{wide}))$$ (35)

Figure 20:
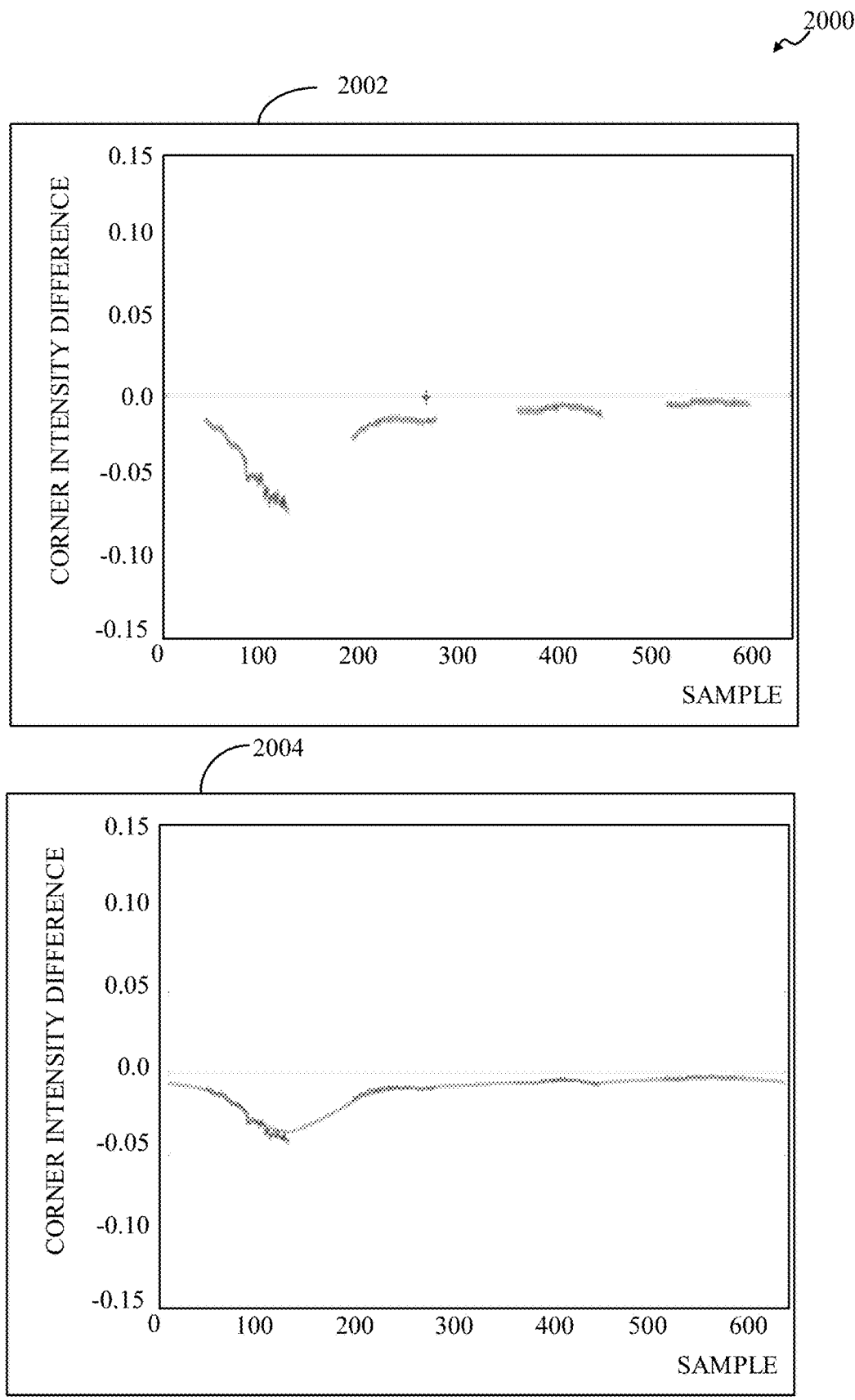
FIG. 20 is an example of plots of corner observations in accordance with implementations of this disclosure.

FIG. 20 is an example 2000 of plots of corner observations in accordance with implementations of this disclosure. A graph 2002 shows the corner intensity differences as calculated from an image values. A graph 2004 shows results of the regularization using equation (37). That is, the plot 2004 shows corner observations with the derived estimator. The graphs 2002, 2004 illustrate the way polar data are interpolated between areas with valid values and areas with invalid values. The graph 2004 illustrates the additional smoothing, as described above.

At 1812, the technique 1800 calculates the differences between the dark back and front intensities in the luma (Y) component between the back and front profiles, which have been aligned and regularized. The technique 1800 calculates the differences $\Delta C_Y$ (i.e., the differences on the dark corners) using equation (36):

For $k \in [0,N-1]$ $$\Delta C_Y(k)=C_{b,Y}^*(k)-C_{f,Y}^*(k)$$ (36)

Figure 21:
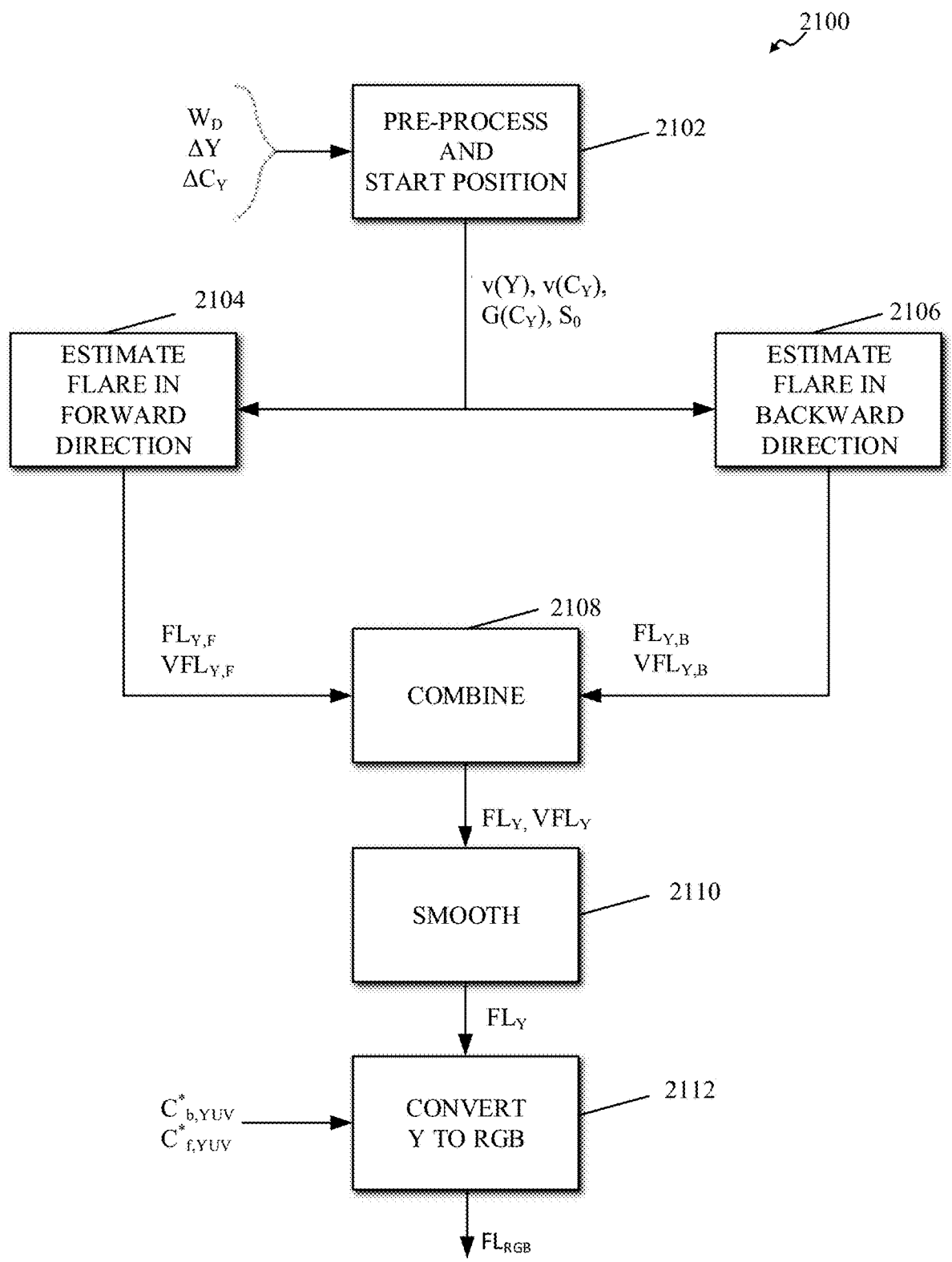
FIG. 21 is an example of a flowchart of a technique for flare estimation in accordance with an implementation of this disclosure.

FIG. 21 is an example of a flowchart of a technique 2100 for flare estimation in accordance with an implementation of this disclosure.

Estimating the flare in the Luminance version can be similar to estimating the flare as described above with respect to the RGB version with at least a difference that the flare estimation is computed on the scalar luminance Y components instead of the RGB profile values.

Estimating the flare in the Luminance version can include defining a starting position So on the stitch line; estimating the flare in both a forward and a backward direction; combining the results of the forward and backward estimations of the flare; and convolving the resulting estimation with a Gaussian kernel.

The technique 2100 receives, as input, dark contribution profile weights $W_D$, the ring differences in the luminance component $\Delta Y$, and the differences on the dark corners $\Delta C_Y$.

The dark contribution profile weights $W_D$ can be a static value and can be defined for still images and arrays of images as a scalar array with values in the range [0,1]. The scalar values can represent respective confidences in the dark corner values. A confidence value in a dark corner value can depend (e.g., be based) on the area where the information is interpolated (e.g., the information is not available), the special angular position of the camera foot where the stitching algorithm does not search for the best correspondences, other factors, or a combination thereof. The dark contribution profile weights $W_D$ can be used to tune the flare compensation algorithm (e.g., the technique 1800) and determine the confidence toward dark corners vs intensities inside the image circle.

At 2102, the technique 2100 pre-processes at least some of the inputs to generate some statistics. The statistics can include a local variance of the intensity profiles $v(Y)$, which can be calculated from the ring differences in the luminance component $\Delta Y$; a local variance of the dark corner profiles $v(C_Y)$, which can be calculated from the differences on the dark corners $\Delta C_Y$; and a global measure of the variance in the dark corners $G(C_Y)$, which can also be calculated from the differences on the dark corners $\Delta C_Y$. The local variance can be computed on a sliding window. The local variance can be indicative of the location of the flare, if any. The global variance can be computed on all the profiles. The global variance can indicate whether there is any flare in this image.

The step 2102 also determines the starting position So. The starting position So can be defined as the stitch line position with a minimal absolute value of dark corner differences in Y.

At 2104, the flare is estimated in the forward direction. The result is referred to herein as "forward flare estimate" and denoted $FL_{Y,F}$. The step 2104 can also generate a variance (denoted $VFL_{Y,F}$) of the forward flare estimate $FL_{Y,F}$. If the variance is high, as the flare is a low frequency phenomenon, the forward flare estimate is most likely a false positive. As such, the forward flare estimate can be discarded during the filtering step. At 2106, the flare is estimated in the backward direction. The result is referred to herein as "backward flare estimate" and denoted $FL_{Y,B}$. The step 2106 can also generate a variance (denoted $VFL_{Y,B}$) of the backward flare estimate $FL_{Y,F}$. The variance $VFL_{Y,B}$ can also be used to detect false positives. The steps 2104 and 2106 can be performed in parallel or sequentially.

The algorithm(s) (e.g., steps) for estimating the flare in the forward and the backward direction can be similar to those described above with respect to the RGB version.

At 2108, the technique 2100 combines the forward flare estimate $FL_{Y,F}$ and the backward flare estimate $FL_{Y,B}$ to generate the flare estimate in Y, $FL_Y$. In an example, the technique 2100 combines the forward flare estimate $FL_{Y,F}$ and the backward flare estimate $FL_{Y,B}$ by averaging them. The technique 2100 can also generate a variance (denoted $VFL_Y$) of the flare estimate in Y $FL_Y$.

At 2110, the technique 2100 smoothes the flare estimate in Y, $FL_Y$. As mentioned above, flare estimation is a low frequency phenomenon. Thus, any high frequency variation in the raw flare profile may be due to at least one or more of stitching issues, dust on the lens, objects being too close to the camera (e.g., a mount, a tripod, etc.), noise, or other conditions. In order to remove such conditions, the flare profile can be filtered using a filter (such as a Kalman filter) that removes the high frequencies and/or the false positives.

At 2112, the technique 2100 converts the smoothed flare estimate in Y, $FL_Y$, to an RGB flare estimate, $FL_{RGB}$. Before the RGB flare estimate, $FL_{RGB}$ is computed, the technique 2100 generates a flare estimate for each of the U and V chroma components, which are denoted, respectively, $FL_U$ and $FL_V$. That is, once the flare is estimated in Y, YUV values can be reconstructed from the dark corners YUV values, using equation (37):

$$\text{For } k \in [0, N-1] \quad (37)$$

$$FL_U(k) = FL_Y(k) \cdot \frac{C^*_{b,U}(k)}{C^*_{b,Y}(k)} \quad \text{If } FL_Y(k) \geq 0$$

$$= FL_Y(k) \cdot \frac{C^*_{b,U}(k)}{C^*_{f,Y}(k)} \quad \text{If } FL_Y(k) < 0$$

$$FL_V(k) = FL_Y(k) \cdot \frac{C^*_{b,V}(k)}{C^*_{b,Y}(k)} \quad \text{If } FL_Y(k) \geq 0$$

$$= FL_Y(k) \cdot \frac{C^*_{b,V}(k)}{C^*_{f,Y}(k)} \quad \text{If } FL_Y(k) < 0$$

The flare RGB, $FL_{RGB}$, can then be deduced (i.e., generated, calculated, etc.) from the YUV profiles (i.e., $FL_Y$, $FL_U$, and $FL_V$) by applying a conversion matrix YUV2RGB, which converts YUV values to RGB values. It is noted that with equation (37), the U and V flare estimates are derived from the Y flare estimate. More precisely, the flare estimation algorithm of the Luminance version represents flare for the Y component on the one side and U/Y and V/Y on the other side (as opposed to generating flare estimates for each of the Y, U, and V components). As such, when the flare intensity from one frame to another (such as in a video) doubles, the flare in Y doubles; however, U/V and Y/V remain constant. That is, the ratios U/Y and V/Y are independent of the amplitude of the flare.

Converting the flare profile to the RGB flare profile can use a color estimated from dark corners. As described above, the dark corners can be used to provide very good estimations of the color. Whereas in the RGB version or flare reduction, the color can sometimes be missed (e.g., unused, unaccounted for, ignored, etc.) by estimating flare independently between the R, G, and B channels, in the Luminance version, the color can be accounted for.

The estimation based on the luminance channel can be faster (e.g., 3 times faster) as the estimation is performed on a 1-dimensional scalar vector having a size that is equal to the number of considered stitch line points. Contrastingly, the estimation based on the RGB channels is performed on 2-dimensional vectors where the first dimension corresponds to each of the channels (e.g., 3) and the second dimension corresponds to the number of considered stitch line points.

Additionally, the risk of creating wrong colors for the flare-compensated image points can be reduced with performing the flare compensation based on the luminance channel. This is so for at least two reasons. Firstly, the RGB version needs RGB values for the difference on the dark corners. In some image areas, the RGB values are interpolated. Computing the difference of linearly interpolated colors can easily lead to wrong color estimation, which, in turn can lead to color artefact in the final correction. Contrastingly, the Luminance version does not subtract color information. Secondly, the RGB version uses independent scales for each of the RGB channels between the dark corners and ring intensity profiles can lead to wrong flare color estimates because these scales can vary at high frequencies.

Figure 22:
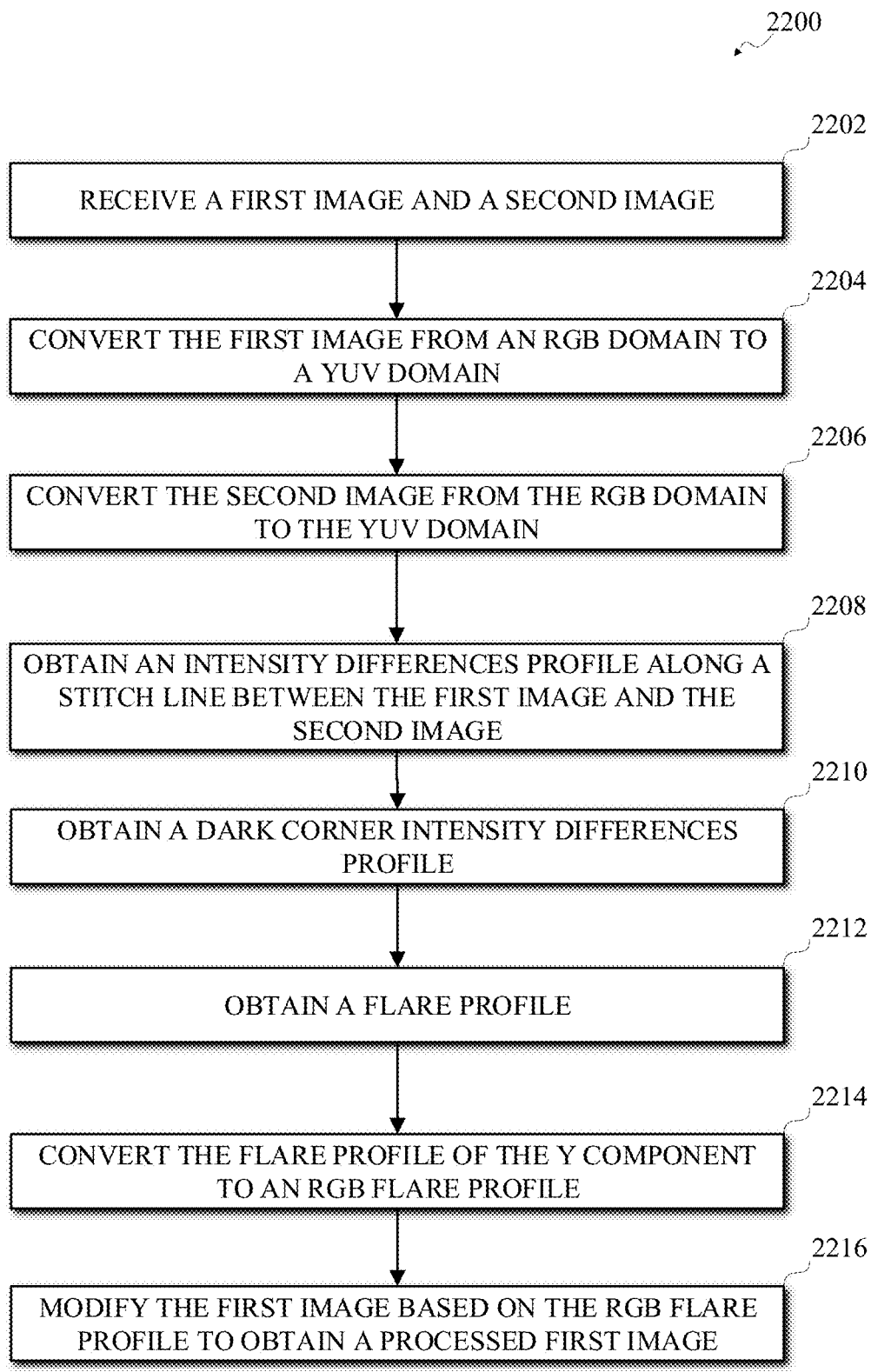
FIG. 22 is an example of a flowchart of a technique for flare compensation in images in accordance with an implementation of this disclosure.

FIG. 22 is an example of a flowchart of a technique 2200 for flare compensation in images in accordance with an implementation of this disclosure. The technique 2200 may be implemented in an image capture apparatus, such as the image capture apparatus 200 shown in FIG. 2, the image capture system 300 shown in FIG. 3A, or the image capture system 330 shown in FIG. 3B. For example, the image signal processor 500 shown in FIG. 5 may implement the technique 2200.

At 2202, the technique 2200 can receive a first image and a second image. At 2204, the technique 2200 converts the first image from an RGB domain to a YUV domain. At 2206, the technique 2200 converts the second image from the RGB domain to the YUV domain. The component Y of the YUV domain corresponds to the luminance (Y) component. The technique 2200 can convert the images from the RGB domain to the YUV domain as described above. Thus, converting a first image from the RGB domain to the YUV domain can include converting at least some pixels of the image from the RGB domain to the YUV domain to obtain statistics.

At 2208, the technique 2200 obtains, as described above, an intensity differences profile along a stitch line between the first image and the second image. The intensity differences profile can be obtained for the Y (i.e., the luminance) component. As used is this disclosure, obtain can mean determine, calculate, identify, produce, construct, generate, specify, or other obtain in any manner whatsoever.

At 2210, the technique 2200 obtains a dark corner intensity differences profile between the first image and the second image. As described above, the dark corner intensity differences profile can be obtained based on a relative illumination of an area outside a first image circle of the first image and a second image circle of the second image. The dark corner intensity differences profile is obtained for the Y component. The dark corner intensity differences profile between the first image and the second image can be obtained for positions outside image disks of the first image and the second image and at constant radial distances from a respective center of each disk and at angles equivalent to angles of the stitch line.

At 2212, the technique 2200 obtains a flare profile. As described above, the flare profile can be obtained using the intensity differences profile and the dark corner intensity differences profile. The flare profile is obtained for the Y component. Obtaining the flare profile using the intensity differences profile and the dark corner intensity differences profile can include identifying a starting point along the stitch line; obtaining a forward flare estimate starting at the starting point, wherein the forward flare estimate is obtained for the Y component; obtaining a backward flare estimate starting at the starting point, wherein the backward flare estimate is obtained for the Y component; obtaining a luminance Y flare estimate by combining the forward flare estimate and the backward flare estimate; and obtaining an RGB flare estimate using the luminance Y flare estimate and a color estimate, wherein the color estimate is obtained from dark corners.

As described above, obtaining the RGB flare estimate using the luminance Y flare estimate can include obtaining a chrominance U flare profile from the luminance Y flare estimate; obtaining a chrominance V flare profile from the luminance Y flare estimate; and obtaining the RGB flare estimate using the luminance Y flare estimate, the chrominance U flare profile, and the chrominance V flare profile.

At 2214, the technique 2200 converts, as described above, the flare profile of the Y component to an RGB flare profile. Thus, converting the flare profile to the RGB flare profile can include converting the flare profile to the RGB flare profile using a color obtained from dark corners.

At 2216, the technique 2200 modifies, as described above, the first image based on the RGB flare profile to obtain a processed first image. The technique 2200 can also modify the second image based on the RGB flare profile to obtain a processed second image.

Figure 23:
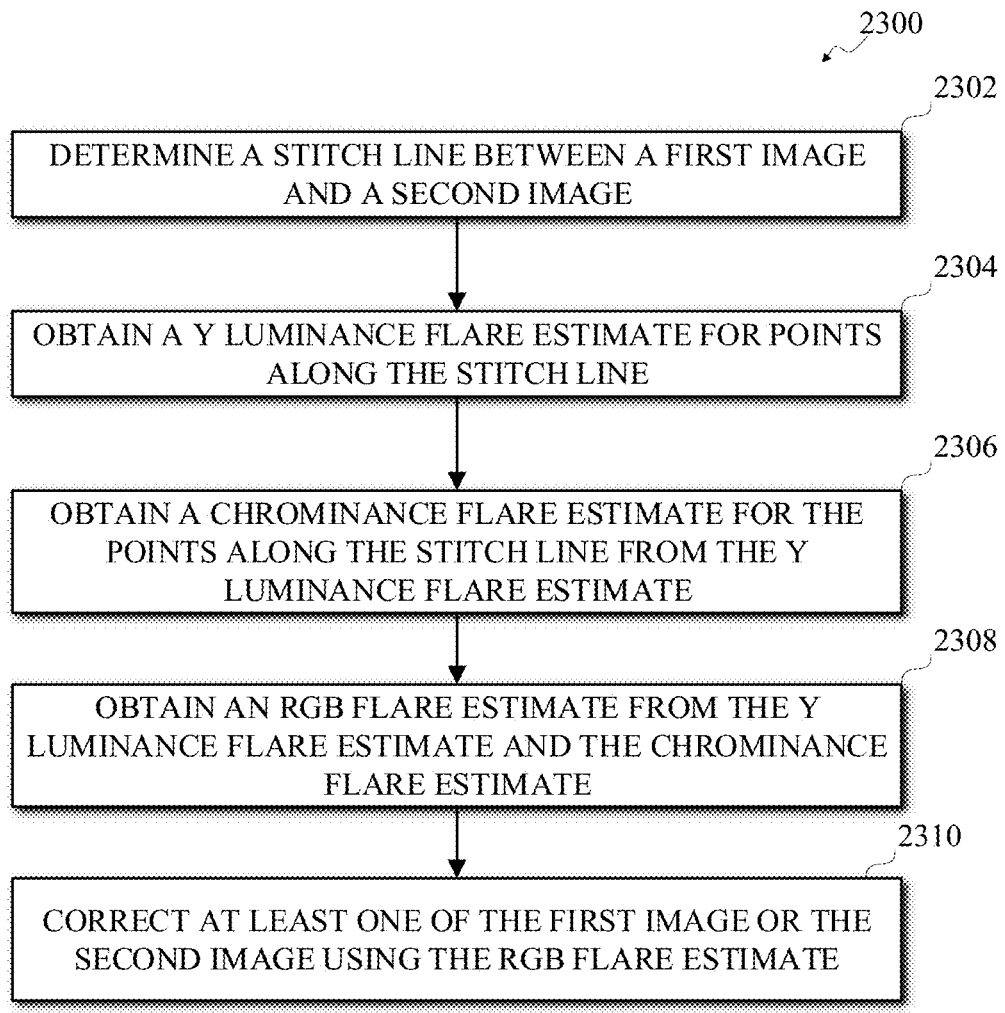
FIG. 23 is an example of a flowchart of a technique for flare compensation in images in accordance with an implementation of this disclosure.

FIG. 23 is an example of a flowchart of a technique 2300 for flare compensation in images in accordance with an implementation of this disclosure. The technique 2300 may be implemented in an image capture apparatus, such as the image capture apparatus 200 shown in FIG. 2, the image capture system 300 shown in FIG. 3A, or the image capture system 330 shown in FIG. 3B. For example, the image signal processor 500 shown in FIG. 5 may implement the technique 2300.

At 2302, the technique 2300 determines, as described above, a stitch line between a first image and a second image. At 2304, the technique 2300 obtains, as described above, a Y luminance flare estimate for points along the stitch line.

At 2306, the technique 2300 obtains, as described above, a chrominance flare estimate for the points along the stitch line. As described above, the chrominance flare estimate from the Y luminance flare estimate can be obtained using a function that, for a point of the stitch line, uses a respective ratio of a chrominance value related to the point of the stitch line and a luminance value related to the point of the stitch line. The chrominance flare estimate can include at least one of a U chrominance flare estimate or a V chrominance flare estimate.

At 2308, the technique 2300 obtains an RGB flare estimate from the Y luminance flare estimate and the chrominance flare estimate. As described above, obtaining the RGB flare estimate can include obtaining a dark corner intensity differences profile between the first image and the second image based on a relative illumination of an area outside a first image circle of the first image and a second image circle of the second image. The dark corner intensity differences profile can be obtained for a Y luminance component, as described above. Obtaining the dark corner intensity differences profile can include obtaining a first intensity average and a first intensity variance corresponding to the first image; obtaining a second intensity average and a second intensity variance corresponding to the second image; and obtaining the dark corner intensity differences profile using the first intensity average, the first intensity variance, the second intensity average, and the second intensity variance. The first intensity average and the first intensity variance can be obtained using first spatial averaging pixels of first concentric circles centered at a first optical center corresponding to the first image. The second intensity average and the second intensity variance can be obtained using second spatial averaging pixels of second concentric circles centered at a second optical center corresponding to the second image.

Obtaining the dark corner intensity differences profile using the first intensity average, the first intensity variance, the second intensity average, and the second intensity variance can include obtaining first YUV color information and second YUV color information corresponding, respectively, to the first image and the second image.

At 2310, the technique 2300 corrects at least one of the first image or the second image using the RGB flare estimate.

In an example, the technique 2300 can further include obtaining an intensity difference profile along the stitch line and obtaining a dark corner intensity differences profile.

Figure 24:
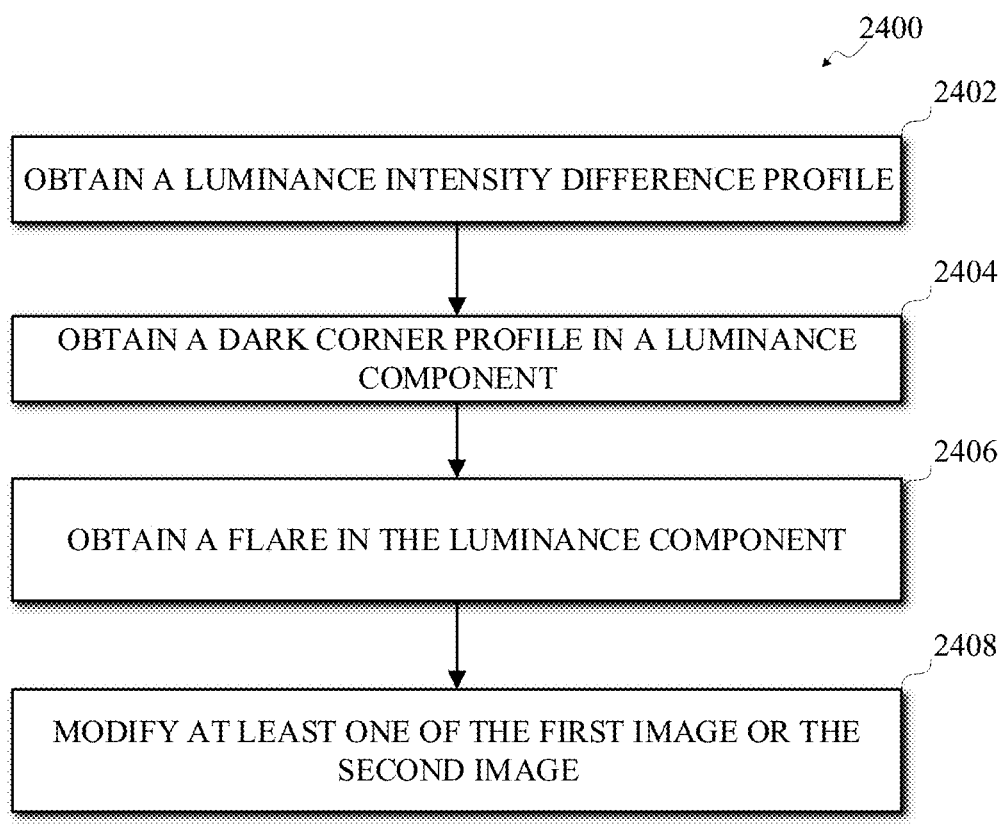
FIG. 24 is an example of a flowchart of a technique for flare compensation in images in accordance with an implementation of this disclosure.

FIG. 24 is an example of a flowchart of a technique 2400 for flare compensation in images in accordance with an implementation of this disclosure. The technique 2400 may be implemented in an image capture apparatus, such as the image capture apparatus 200 shown in FIG. 2, the image capture system 300 shown in FIG. 3A, or the image capture system 330 shown in FIG. 3B. For example, the image signal processor 500 shown in FIG. 5 may implement the technique 2400.

At 2402, the technique 2400 obtains, as described above, a luminance intensity difference profile along a stitch line between a first image and a second image. The first image can be obtained using a first camera sensor and the second image can be obtained using a second camera sensor.

At 2404, the technique 2400 obtains a dark corner profile in a luminance component. As described above, the dark corner profile can be obtained based on a relative illumination of an area outside a first image circle of the first image and a second image circle of the second image circle. Obtaining the dark corner profile can include computing a first YUV dark corner intensity alignment from the first image; compute a second YUV dark corner intensity alignment from the second image; and obtaining the dark corner profile in the luminance component as a difference between respective Y components of the first YUV dark corner intensity alignment and the second YUV dark corner intensity alignment.

The first image circle can include first gaps and the second image circle can include second gaps. The first gaps can be located where the first image is tangent to the first image circle and the second gaps can be located where the second image is tangent to the second image circle. Thus, and as described above, obtaining the first dark corner intensity alignment can include filling the first gaps; and obtaining the second dark corner intensity alignment can include filling the second gaps.

At 2406, the technique 2400 obtains a flare in the luminance component using the luminance intensity difference profile and the dark corner profile in the luminance component. The flare in the luminance component can be obtained as described above. Obtaining the dark corner profile in the luminance component can include obtaining a first dark corner intensity alignment using first average intensities of a first dark corner of the first image, a first exposure value of the first image, a black level value, and a first white balance per-unit scales of the first image; obtaining a second dark corner intensity alignment using second average intensities of a second dark corner of the second image, a second exposure value of the second image, the black level value, and a second white balance per-unit scales of the first image; obtaining the first YUV dark corner intensity alignment from the first dark corner intensity alignment; and obtaining the second YUV dark corner intensity alignment from the second dark corner intensity alignment.

In an example, and as described above, obtaining the flare in the luminance component can include identifying a starting point along the stitch line between the first image and the second image; obtaining a forward flare estimate starting at the starting point, where the forward flare estimate is obtained for the Y component; obtaining a backward flare estimate starting at the starting point, where the backward flare estimate is obtained for the Y component; and obtaining the flare in the luminance component by combining the forward flare estimate and the backward flare estimate.

At 2408, the technique 2400 modifies at least one of the first image or the second image using the flare in the luminance component to obtain a reduced-flare first image or a reduced-flare second image. Modifying at least one of the first image or the second image can include obtaining an RGB flare estimate using the flare in the luminance component.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for flare compensation in images, comprising:
    receiving a first image and a second image;
    converting the first image from an RGB domain to a YUV domain, wherein Y corresponds to a luminance (Y) component;
    converting the second image from the RGB domain to the YUV domain;
    obtaining an intensity differences profile along a stitch line between the first image and the second image, wherein the intensity differences profile is obtained for the Y component;
    obtaining a dark corner intensity differences profile between the first image and the second image based on a relative illumination of an area outside a first image circle of the first image and a second image circle of the second image, wherein the dark corner intensity differences profile is obtained for the Y component;
    obtaining a flare profile using the intensity differences profile and the dark corner intensity differences profile, wherein the flare profile is for the Y component;
    converting the flare profile of the Y component to an RGB flare profile; and
    modifying the first image based on the RGB flare profile to obtain a processed first image.

2. The method of claim 1, further comprising:
    modifying the second image based on the RGB flare profile to obtain a processed second image.

3. The method of claim 1, wherein converting the flare profile to the RGB flare profile comprises:
    converting the flare profile to the RGB flare profile using a color obtained from dark corners.

4. The method of claim 1, wherein converting the first image from the RGB domain to the YUV domain comprises:
    converting at least some pixels of the first image from the RGB domain to the YUV domain to obtain statistics.

5. The method of claim 1, wherein the dark corner intensity differences profile between the first image and the second image is obtained for positions outside image disks of the first image and the second image and at constant radial distances from a respective center of each disk and at angles equivalent to angles of the stitch line.

6. The method of claim 1, wherein obtaining the flare profile using the intensity differences profile and the dark corner intensity differences profile comprises:
  identifying a starting point along the stitch line;
  obtaining a forward flare estimate starting at the starting point, wherein the forward flare estimate is obtained for the Y component;
  obtaining a backward flare estimate starting at the starting point, wherein the backward flare estimate is obtained for the Y component;
  obtaining a luminance Y flare estimate by combining the forward flare estimate and the backward flare estimate; and
  obtaining an RGB flare estimate using the luminance Y flare estimate and a color estimate, wherein the color estimate is obtained from dark corners.

7. The method of claim 6, wherein obtaining the RGB flare estimate using the luminance Y flare estimate comprises:
  obtaining a chrominance U flare profile from the luminance Y flare estimate;
  obtaining a chrominance V flare profile from the luminance Y flare estimate; and
  obtaining the RGB flare estimate using the luminance Y flare estimate, the chrominance U flare profile, and the chrominance V flare profile.

8. A device for flare estimation comprising:
  a processor configured to:
    determine a stitch line between a first image and a second image;
    obtain a Y luminance flare estimate for points along the stitch line;
    obtain a chrominance flare estimate for the points along the stitch line from the Y luminance flare estimate using a function that, for a point of the stitch line, uses a respective ratio of a chrominance value related to the point of the stitch line and a luminance value related to the point of the stitch line;
    obtain an RGB flare estimate from the Y luminance flare estimate and the chrominance flare estimate; and
    correct at least one of the first image or the second image using the RGB flare estimate.

9. The device of claim 8, wherein the chrominance flare estimate comprises a U chrominance flare estimate and a V chrominance flare estimate.

10. The device of claim 8, wherein the processor is further configured to:
  obtain an intensity difference profile along the stitch line; and
  obtain a dark corner intensity differences profile.

11. The device of claim 8, wherein to obtain the RGB flare estimate from the Y luminance flare estimate and the chrominance flare estimate comprises to:
  obtain a dark corner intensity differences profile between the first image and the second image based on a relative illumination of an area outside a first image circle of the first image and a second image circle of the second image.

12. The device of claim 11, wherein the dark corner intensity differences profile is obtained for a Y luminance component.

13. The device of claim 11, wherein to obtain the dark corner intensity differences profile between the first image and the second image comprises to:
  obtain a first intensity average and a first intensity variance corresponding to the first image;
  obtain a second intensity average and a second intensity variance corresponding to the second image; and
  obtain the dark corner intensity differences profile using the first intensity average, the first intensity variance, the second intensity average, and the second intensity variance.

14. The device of claim 13,
  wherein the first intensity average and the first intensity variance are obtained using first spatial averaging pixels of first concentric circles centered at a first optical center corresponding to the first image, and
  wherein the second intensity average and the second intensity variance are obtained using second spatial averaging pixels of second concentric circles centered at a second optical center corresponding to the second image.

15. The device of claim 13, wherein to obtain the dark corner intensity differences profile using the first intensity average, the first intensity variance, the second intensity average, and the second intensity variance comprises to:
  obtain first YUV color information and second YUV color information corresponding, respectively, to the first image and the second image.

16. A non-transitory computer-readable storage medium, comprising executable instructions that, when executed by a processor, facilitate performance of operations comprising operations to:
  obtain a luminance intensity difference profile along a stitch line between a first image and a second image, wherein the first image is obtained using a first camera sensor and the second image is obtained using a second camera sensor;
  obtain a dark corner profile in a luminance component based on a relative illumination of an area outside a first image circle of the first image and a second image circle of the second image circle by operations comprising operations to:
    obtain a first YUV dark corner intensity alignment from the first image;
    obtain a second YUV dark corner intensity alignment from the second image; and
    obtain the dark corner profile in the luminance component as a difference between respective luminance components of the first YUV dark corner intensity alignment and the second YUV dark corner intensity alignment;
  obtain a flare in the luminance component using the luminance intensity difference profile and the dark corner profile in the luminance component; and
  modify at least one of the first image or the second image using the flare in the luminance component to obtain a reduced-flare first image or a reduced-flare second image.

17. The non-transitory computer-readable storage medium of claim 16, wherein to obtain the dark corner profile in the luminance component further comprises to:
  obtain a first dark corner intensity alignment using first average intensities of a first dark corner of the first image, a first exposure value of the first image, a black level value, and a first white balance per-unit scales of the first image;
  obtain a second dark corner intensity alignment using second average intensities of a second dark corner of the second image, a second exposure value of the second image, the black level value, and a second white balance per-unit scales of the first image;

obtain the first YUV dark corner intensity alignment from the first dark corner intensity alignment; and obtain the second YUV dark corner intensity alignment from the second dark corner intensity alignment.

18. The non-transitory computer-readable storage medium of claim 16, wherein the first image circle includes first gaps and the second image circle includes second gaps, wherein the first gaps are located where the first image is tangent to the first image circle, wherein the second gaps are located where the second image is tangent to the second image circle, wherein to obtain the first YUV dark corner intensity alignment comprises to:

fill the first gaps; and wherein to obtain the second YUV dark corner intensity alignment comprises to:

fill the second gaps.

19. The non-transitory computer-readable storage medium of claim 16, wherein to obtain the flare in the luminance component using the luminance intensity difference profile and the dark corner profile in the luminance component comprises to:

identify a starting point along the stitch line between the first image and the second image;

obtain a forward flare estimate starting at the starting point, wherein the forward flare estimate is obtained for the luminance component;

obtain a backward flare estimate starting at the starting point, wherein the backward flare estimate is obtained for the luminance component; and obtain the flare in the luminance component by combining the forward flare estimate and the backward flare estimate.

20. The non-transitory computer-readable storage medium of claim 19, wherein to modify the at least one of the first image or the second image using the flare in the luminance component comprises to:

obtain an RGB flare estimate using the flare in the luminance component.

\* \* \* \* \*